US011563743B2

(12) United States Patent
Liu

(10) Patent No.: US 11,563,743 B2
(45) Date of Patent: Jan. 24, 2023

(54) SECURITY MANAGEMENT FOR RESTRICTED LOCAL OPERATOR SERVICES IN COMMUNICATION SYSTEM

(71) Applicant: Nokia Technologies Oy, Espoo (FI)

(72) Inventor: Jennifer J-N. Liu, Plano, TX (US)

(73) Assignee: Nokia Technologies Oy, Espoo (FI)

( * ) Notice: Subject to any disclaimer, the term of this patent is extended or adjusted under 35 U.S.C. 154(b) by 216 days.

(21) Appl. No.: 16/792,339

(22) Filed: Feb. 17, 2020

(65) Prior Publication Data

US 2021/0258316 A1 Aug. 19, 2021

(51) Int. Cl.
*H04L 9/40* (2022.01)

(52) U.S. Cl.
CPC ........ *H04L 63/102* (2013.01); *H04L 63/0236* (2013.01); *H04L 63/0853* (2013.01); *H04L 63/0876* (2013.01); *H04L 63/20* (2013.01)

(58) Field of Classification Search
CPC .............................. H04L 63/102; H04L 63/20

USPC .............................................................. 726/1
See application file for complete search history.

(56) References Cited

U.S. PATENT DOCUMENTS

| 2020/0084741 A1* | 3/2020 | Chun | ................ H04W 48/02 |
| 2020/0213897 A1* | 7/2020 | Qiao | ................ H04M 15/8228 |
| 2020/0245235 A1* | 7/2020 | Chun | ................ H04W 48/18 |

* cited by examiner

*Primary Examiner* — Anthony D Brown
(74) *Attorney, Agent, or Firm* — Ryan, Mason & Lewis, LLP

(57) ABSTRACT

Techniques for security management in communication systems are provided. For example, a method comprises maintaining a list of networks that support access for a set of restricted local operator services, checking whether a set of conditions for triggering access to the set of restricted local operator services is satisfied, receiving a request for access to the set of restricted local operator services, and initiating, upon satisfaction of the set of conditions, a search of the list of networks to find a network for access to the set of restricted local operator services.

27 Claims, 23 Drawing Sheets

| Identifier: '6FE8' | Structure: transparent | Optional |
|---|---|---|
| File size: Z bytes | | Update activity: low |
| Access Conditions: <br> READ PIN <br> UPDATE ADM <br> ACTIVATE ADM <br> DEACTIVATE ADM | | |

| Bytes | Description | M/O | Length |
|---|---|---|---|
| 1 to Z | NAS configuration parameter TLV objects | M | Z bytes |

FIG. 21

| Description | Value | M/O/C | Length (bytes) |
|---|---|---|---|
| NAS signalling priority Tag | '80' | O | 1 |
| Length | L1 | C | Note 1 |
| ... | | | |
| RLOSSupportedPLMNList Tag | '8E' | O | 1 |
| Length | L15 | C | 4n (Note 1) |
| RLOSSupportedPLMNList value | – | C | L15 |
| RLOSAllowedMCCList Tag | '8F' | O | 1 |
| Length | L16 | C | 2n (Note 1) |
| RLOSAllowedMCCList value | – | C | L16 |
| Note 1: The length is coded according to ISO/IEC 8825-1 [35] | | | |
| Note 2: C, if the Tag is present, this is mandatory. | | | |

FIG. 22

| Bytes | Description | M/O | Length |
|---|---|---|---|
| 1 to 2 | 1st MCC | M | 2 bytes |
| 3 to 4 | 2nd MCC | O | 2 bytes |
| 5 to 6 | 3rd MCC | O | 2 bytes |
| ... | ... | ... | ... |
| (2n-1) to (2n) | nth MCC | O | 2 bytes |

FIG. 23

SECURITY MANAGEMENT FOR RESTRICTED LOCAL OPERATOR SERVICES IN COMMUNICATION SYSTEM

FIELD

The field relates generally to communication systems, and more particularly, but not exclusively, to provisioning of services within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in third generation partnership project (3GPP) Technical Specification (TS) 23.501, V16.3.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 3GPP Technical Specification (TS) 33.501, V16.1.0, entitled "Technical Specification Group Services and System Aspects; Security Architecture and Procedures for the 5G System," the disclosure of which is incorporated by reference herein in its entirety, further describes security management details associated with a 5G network.

Network performance is an important consideration in any communication system. For example, processing of control plane messages received by the core network from user equipment can have a significant impact on network performance. However, management of such communications presents several challenges in existing 5G approaches.

SUMMARY

Illustrative embodiments provide improved techniques for security management for restricted local operator services in a communication system.

For example, in one illustrative embodiment, a method comprises maintaining a list of networks that support access for a set of restricted local operator services, checking whether a set of conditions for triggering access to the set of restricted local operator services is satisfied, receiving a request for access to the set of restricted local operator services, and initiating, upon satisfaction of the set of conditions, a search of the list of networks to find a network for access to the set of restricted local operator services.

The method may further comprise sending, upon selecting a network, an initial mobility management request to a mobility and security management node of the selected network to establish connection, receiving from the mobility and security management node a command request indicating a set of security algorithms selected by the network to be used for a security context, sending to the mobility and security management node in the selected network a confirmation that the selected set of security algorithms are used to establish the security context, and receiving from the mobility and security management node a notification indicating that the mobility management request has been accepted by the selected network.

In another illustrative embodiment, a method comprises supporting a set of restricted local operator services that can be accessed by unauthenticated user equipment, receiving an initial mobility management request from the unauthenticated user equipment, sending a command request to the unauthenticated user equipment indicating a set of security algorithms to be used for a security context, receiving from the unauthenticated user equipment a confirmation that the set of security algorithms are used to establish the security context, and sending a notification to the unauthenticated user equipment indicating that the mobility management request has been accepted.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 21 illustrates a universal integrated circuit card or universal mobile telecommunications service subscriber identity module configuration, according to an illustrative embodiment.

FIG. 22 illustrates a non-access stratum configuration parameter information, according to an illustrative embodiment.

FIG. 23 illustrates coding of allowed mobile country codes, according to an illustrative embodiment.

DETAILED DESCRIPTION

Figure 1:
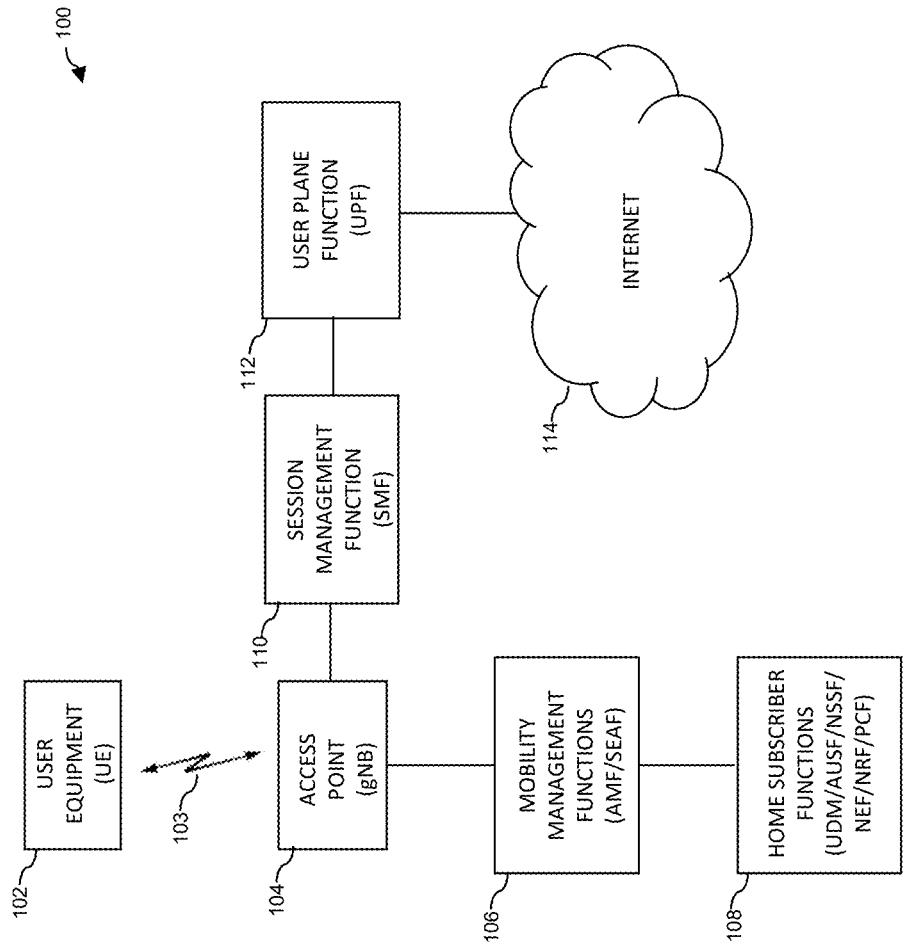
FIG. 1 illustrates a communication system with which one or more illustrative embodiments are implemented.

Embodiments will be illustrated herein in conjunction with example communication systems and associated techniques for security management for restricted local operator services in a communication system. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems. Note that 3GPP stands for 3rd Generation Partnership Project which is a standards organization that develops protocols for mobile telephony and the like.

In accordance with illustrative embodiments implemented in a 5G communication system environment, one or more 3GPP technical specifications (TS) and technical reports (TR) provide further explanation of user equipment and network entities (e.g., network elements, network functions, etc.) and/or operations that interact with one or more illustrative embodiments, e.g., the above-referenced 3GPP TS 23.501 and 3GPP TS 33.501. Other 3GPP TS/TR documents provide other conventional details that one of ordinary skill in the art will realize. For example, TR 23.715 V16.0.0, entitled "Study on System Enhancements for Provision of Access to Restricted Local Operator Services by an Unauthenticated User Equipment (UE)," and TS 33.815, V16.0.0, entitled "Study on Security Aspects of Provision of Access to Restricted Local Operator Services by Unauthenticated UEs (PARLOS)," the disclosures of which are incorporated by reference herein in its entirety, describes general principles for Restricted Local Operator Services (RLOS), with which one or more illustrative embodiments will be described below. However, while illustrative embodiments are well-suited for implementation associated with the above-mentioned 5G-related 3GPP standards, alternative embodiments are not necessarily intended to be limited to any particular standards.

Furthermore, illustrative embodiments may be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to security management for RLOS in communications systems, such as 4G Evolved Packet Core (EPC) networks and 5G networks. Prior to describing such illustrative embodiments, a general description of main components of a 5G network will be described below in the context of FIGS. 1 and 2.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used in other embodiments to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone or other cellular device. In one or more illustrative embodiments, user equipment refers to an IoT device. In such embodiments when the UE is an IoT device, non-limiting examples of such devices may include sensors, monitors, actuators, robotic devices and/or other machine-based devices. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions. The UICC may be a physical card, such as a smart card configured for insertion into a smart card slot of the ME. The UICC may alternatively be an embedded UICC (eUICC).

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in other embodiments are implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

While illustrative embodiments will be described below from the perspective of control plane communications between the UE and the AMF in a 5G system environment, it is to be understood that control plane message management techniques described herein can be applied in a straightforward manner to communication systems other than 5G systems, by way of example only, LTE or other 3GPP systems, as well as any appropriate non 3GPP systems. By way of example only, in an alternative embodiment, where the communication system is an LTE system, the mobility management function is performed by a Mobility Management Entity (MME).

Returning to FIG. 1, AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) are also referred to herein, more generally, as an authentication entity. In addition, home subscriber functions include, but are not limited to, Network Slice Selection Function (NSSF), Network Exposure Function (NEF), Network Repository Function (NRF), and Policy Control Function (PCF).

Note that a UE, such as UE 102, is typically subscribed to what is referred to as a Home Public Land Mobile Network (HPLMN) in which some or all of the home subscriber functions 108 reside. If the UE is roaming (not in the HPLMN), it is typically connected with a Visited Public Land Mobile Network (VPLMN) also referred to as a visited or serving network. Some or all of the mobility management functions 106 may reside in the VPLMN, in which case, functions in the VPLMN communicate with functions in the HPLMN as needed. However, in a non-roaming scenario, mobility management functions 106 and home subscriber functions 108 can reside in the same communication network.

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the user plane (UP) or data plane typically carries network user traffic (user data) while the control plane (CP) typically carries control signaling traffic (control data). SMF 110 supports functionalities relating to UP subscriber sessions, e.g., establishment, modification and release of Protocol Data Unit (PDU) sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between network functions (NFs) and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104. NFs can also access services of other NFs.

Figure 2:
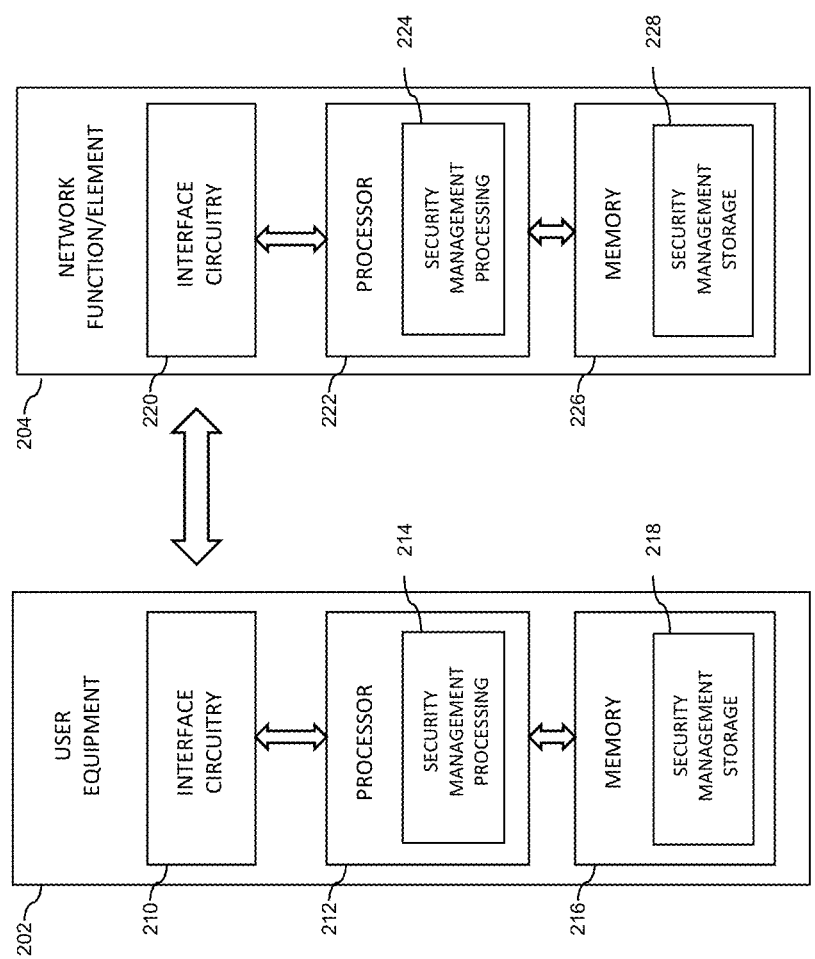
FIG. 2 illustrates processing architectures for user equipment and a network entity with which one or more illustrative embodiments are implemented.

Illustrative embodiments provide improved techniques for security management for UE accessing RLOS in a communication system. FIG. 2 is a block diagram of processing architectures 200 of two participants, i.e., user equipment and a network node (e.g., a network element, a network function or another network entity), in a security management methodology for accessing RLOS in an illustrative embodiment. It is to be appreciated that more than two participants may be involved in a security management methodology for accessing RLOS according to illustrative embodiments. As such, FIG. 2 illustrates processing architectures associated with any two of the participants that directly and/or indirectly communicate. Therefore, in illustrative embodiments, each participant in a security management methodology for accessing RLOS is understood to be configured with the processing architecture shown in FIG. 2.

As shown, user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management for accessing RLOS, as well as other operations, described in conjunction with subsequent figures and otherwise herein. The memory 216 of the user equipment 202 includes a security management storage module 218 that stores data generated or otherwise used during security management for accessing RLOS and other operations.

As further shown, a network node 204 comprises a processor 222 coupled to a memory 226 and interface circuitry 220. The processor 222 of the network node 204 includes a security management processing module 224 that may be implemented at least in part in the form of software executed by the processor 222. The processing module 224 performs security management for accessing RLOS, as well as other operations, described in conjunction with subsequent figures and otherwise herein. The memory 226 of the network node 204 includes a security management storage module 228 that stores data generated or otherwise used during security management for accessing RLOS and other operations.

The processors 212 and 222 of the respective user equipment 202 and network node 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective user equipment 202 and network node 204 may be used to store one or more software programs that are executed by the respective processors 212 and 222 to implement at least a portion of the functionality described herein. For example, operations for security management in accessing RLOS and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective user equipment 202 and network node 204 illustratively comprise transceivers or other communication hardware or firmware that allows the associated system elements to communicate with one another in the manner described herein.

It is apparent from FIG. 2 that user equipment 202 is configured for communication with network node 204 and vice-versa via their respective interface circuitries 210 and 220. This communication involves user equipment 202 sending data to network node 204, and network node 204 sending data to user equipment 202. However, in alternative embodiments, other network elements or other components may be operatively coupled between, as well as to, user equipment 202 and/or network node 204. The term "data" as used herein is intended to be construed broadly, so as to encompass any type of information that may be sent between participants in RLOS access including, but not limited to, messages, tokens, identifiers, keys, indicators, user data, control data, etc.

It is to be appreciated that the particular arrangement of components shown in FIG. 2 is an example only, and numerous alternative configurations are used in other embodiments. For example, any given network element/function can be configured to incorporate additional or alternative components and to support other communication protocols.

RLOS refers to communication services provided by an operator that involve either automated or human assistance (e.g., credit card billing, directory assistance, customer care, etc.) for which successful authentication is not necessary.

There is a need to provide roaming UEs that are in limited service state with network access to RLOS regardless whether the UEs are successfully authenticated or not. This would allow the UE to access a set of local services without necessarily being successfully authenticated via a standardized mechanism (e.g., via dialing a specific string).

For example, there are FCC regulations in the U.S. related to manual roaming in Code of Federal Regulations (CFR) Title 47 Chapter 1 Subchapter B Part 20:

(c) Manual roaming. Each carrier subject to paragraph (a)(1) of this section must provide mobile radio service upon request to all subscribers in good standing to the services of any carrier subject to paragraph (a)(1) of this section, including roamers, while such subscribers are located within any portion of the licensee's licensed service area where facilities have been constructed and service to subscribers has commenced, if such subscribers are using mobile equipment that is technically compatible with the licensee's base stations.

Some operators can already provide access to such local services on a proprietary basis. Given the wide deployment of LTE and data centric applications, it is desirable to enable general support of accessing local operator services via LTE systems. Further, it is desirable for providing architecture and protocol enhancements needed to enable optional support of RLOS.

To meet these needs, a new System Information Block (SIB) is provided by E-UTRAN (Evolved Universal Mobile Telecommunications Service (UMTS) Terrestrial Radio Access Network (UTRAN)) to indicate whether the Public Land Mobile Network (PLMN) is configured to support RLOS. The PLMNs where RLOS is supported may be stored in a UICC or ME. In automatic PLMN selection, if registration cannot be achieved on any PLMN and at least one PLMN offering RLOS has been found, the UE attempts an attach for access to RLOS. During attach, the UE indicates in the Attach Request that the attachment is for RLOS.

Figure 3:
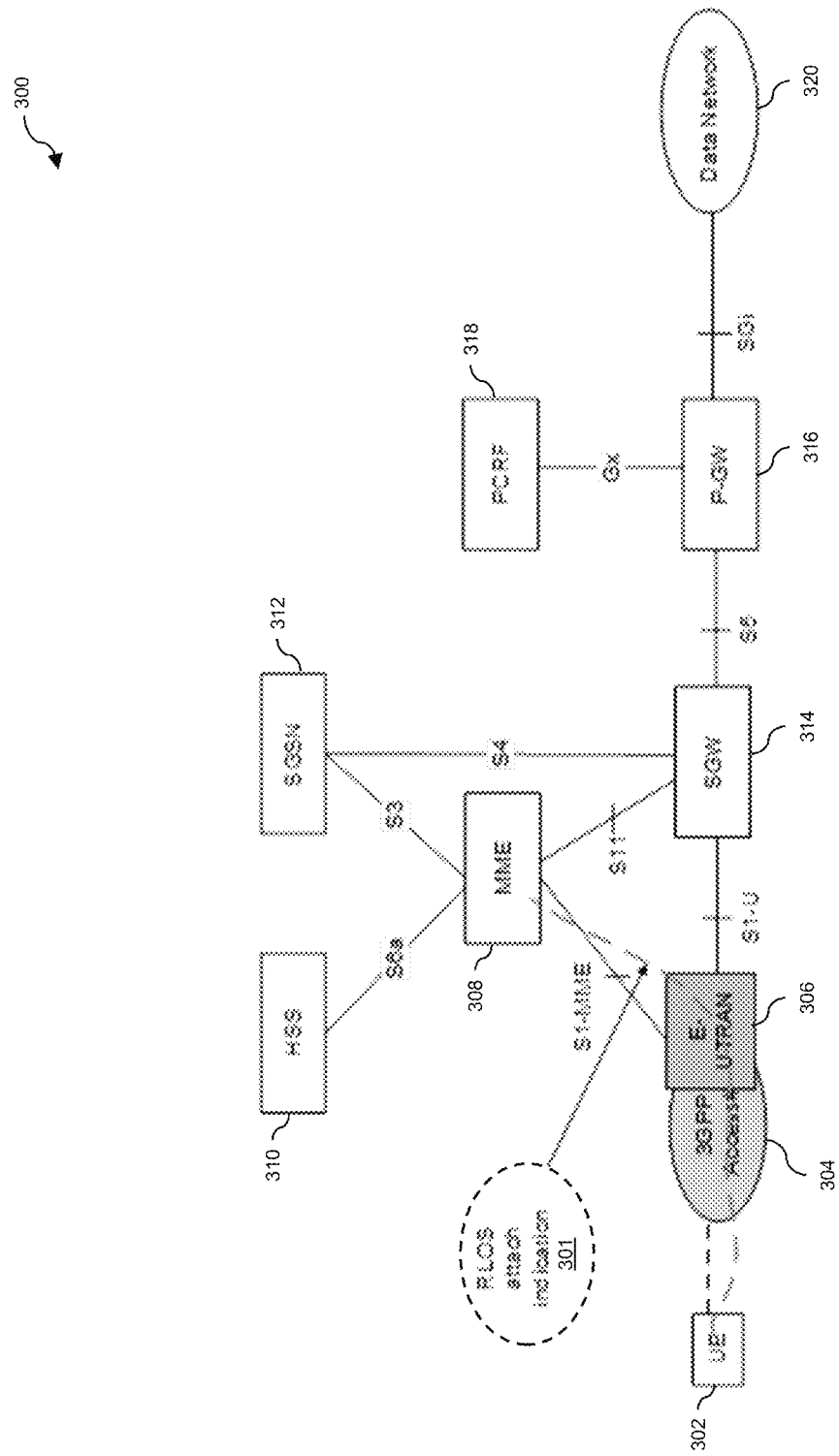
FIG. 3 illustrates part of a communication system, with which one or more illustrative embodiments are implemented, where user equipment attaches to a network with a restricted local operator services indication.

FIG. 3 illustrates a communication system 300, where a UE 302 indicates an RLOS attach 301 when accessing a 4G core network (e.g., 4G EPC) via 3GPP access. The system 300 includes the UE 302, a 3GPP access network 304, an E-UTRAN 306, a Mobility Management Element (MME) 308, Home Subscriber Service (HSS) 310, Serving General Packet Radio Service (GPRS) Support Node (SGSN) 312, Serving Gateway (SGW) 314, a Packet Data Network (PDN) Gateway (P-GW) 316, a Policy and Charging Rules Function (PCRF) 318 and a Data Network (DN) 320. FIG. 3 also illustrates the reference points representing interactions between such elements (e.g., the S6a reference point between the MME 308 and HSS 310, the S4 reference point between the SGSN 312 and SGW 314, etc.). The UE 302 provides an indication of RLOS attach 301 to the MME 308 via the 3GPP access network 304 and E-UTRAN 306 as illustrated.

For authentication, if the MME 308 already has valid credentials for the UE 302, the MME 308 uses the existing credentials and considers the UE 302 as authenticated for RLOS.

If the MME 308 does not have valid credentials for the UE 302 and if the UE 302 IMSI corresponds to the PLMN of the MME 308, then the MME 308 proceeds with the attach procedure to retrieve the security information from the HSS 310, which attempts to authenticate the UE 302. Regardless of the authentication result, the MME 308 shall proceed with the RLOS attach procedure and accept the RLOS Attach request (e.g., be establishing a default Packet Data Network (PDN) connection to a specific RLOS Access Point Name (APN) and accepting the RLOS attach request).

Illustrative embodiments provide techniques for establishing a security context if the authentication is not successful. If the UE 302 does not have a UICC or USIM, for example, no subscription information will be present, and there is no way to retrieve any security information from the HSS 310. In such cases, illustrative embodiments provide techniques for selecting security algorithms (e.g., an integrity protection algorithm, an encryption algorithm) and for establishing the security context to enable the MME 308 to accept the attach request. Several other failure causes could happen, such as during handling of a Tracking Area Update (TAU) request, a service request, etc. Such failure cases include, but are not limited to: no security context during TAU request for the UE 302 with a PDN connection for access to RLOS; TAU failure for the UE 302 with a PDN connection for access to RLOS; no security context during service request for the UE 302 with a PDN connection for access to RLOS; service request failure for the UE 302 with a PDN connection for access to RLOS.

Figure 4:
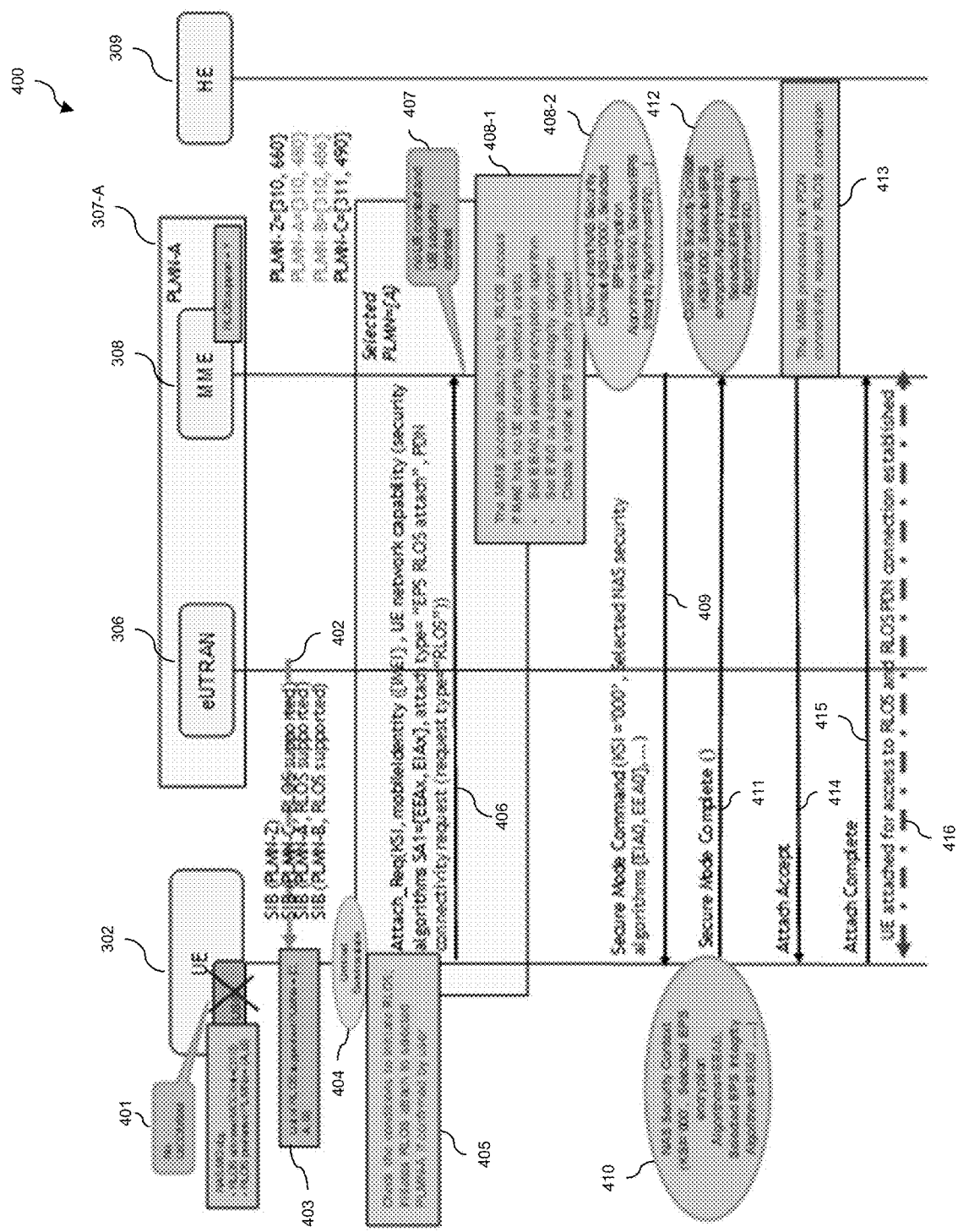
FIG. 4 illustrates a process flow for selection of security algorithms during restricted local operator services access, according to an illustrative embodiment.
Figure 5:
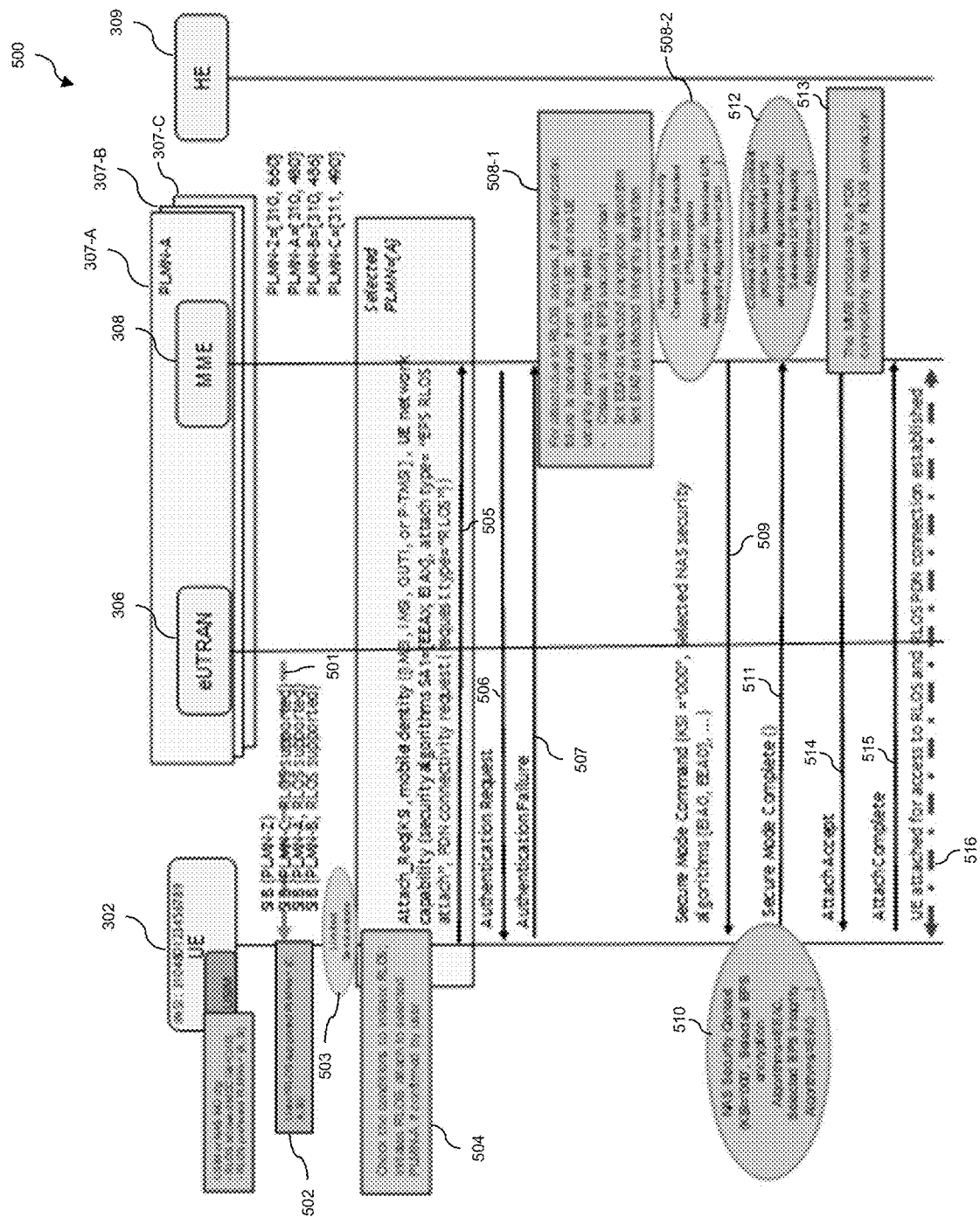
FIG. 5 illustrates a process flow for authentication failure indicated by user equipment during a restricted local operator services attach, according to an illustrative embodiment.
Figure 6:
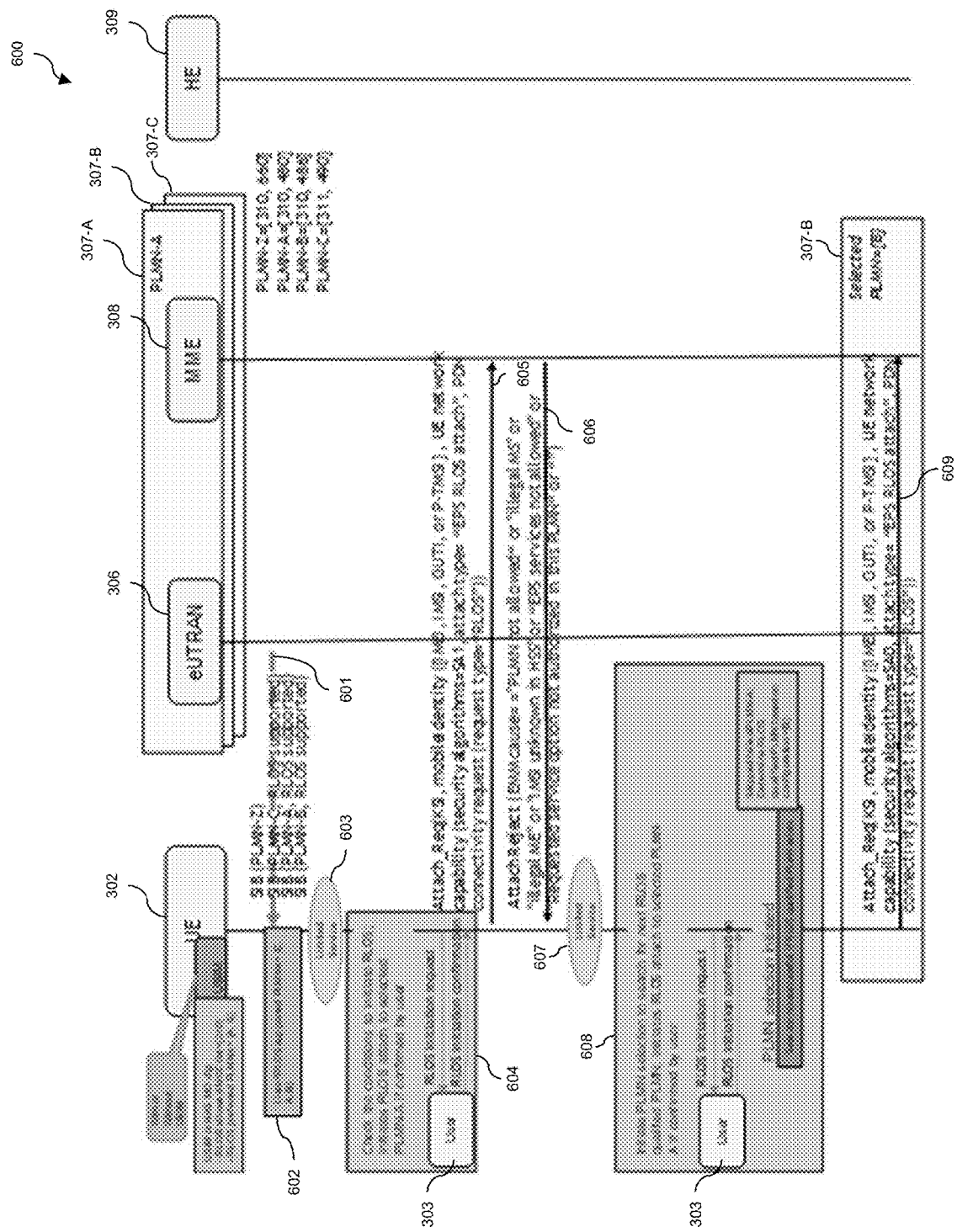
FIG. 6 illustrates a process flow for a communication system rejecting a restricted local operator services attach, according to an illustrative embodiment.

Techniques for handling these scenarios will be described below in conjunction with FIGS. 4-10. More particularly, FIGS. 4-6 illustrate failure handling during RLOS connection attach in a 4G EPC network, with FIG. 4 detailing a procedure for handling a UE 302 with no UICC/USIM or no security context during RLOS attach to the 4G EPC network, FIG. 5 detailing a procedure for handling authentication failure received from the UE 302 during RLOS attach, and FIG. 6 detailing a procedure for handling UE 302 request for RLOS attach which is rejected by the network.

Figure 7:
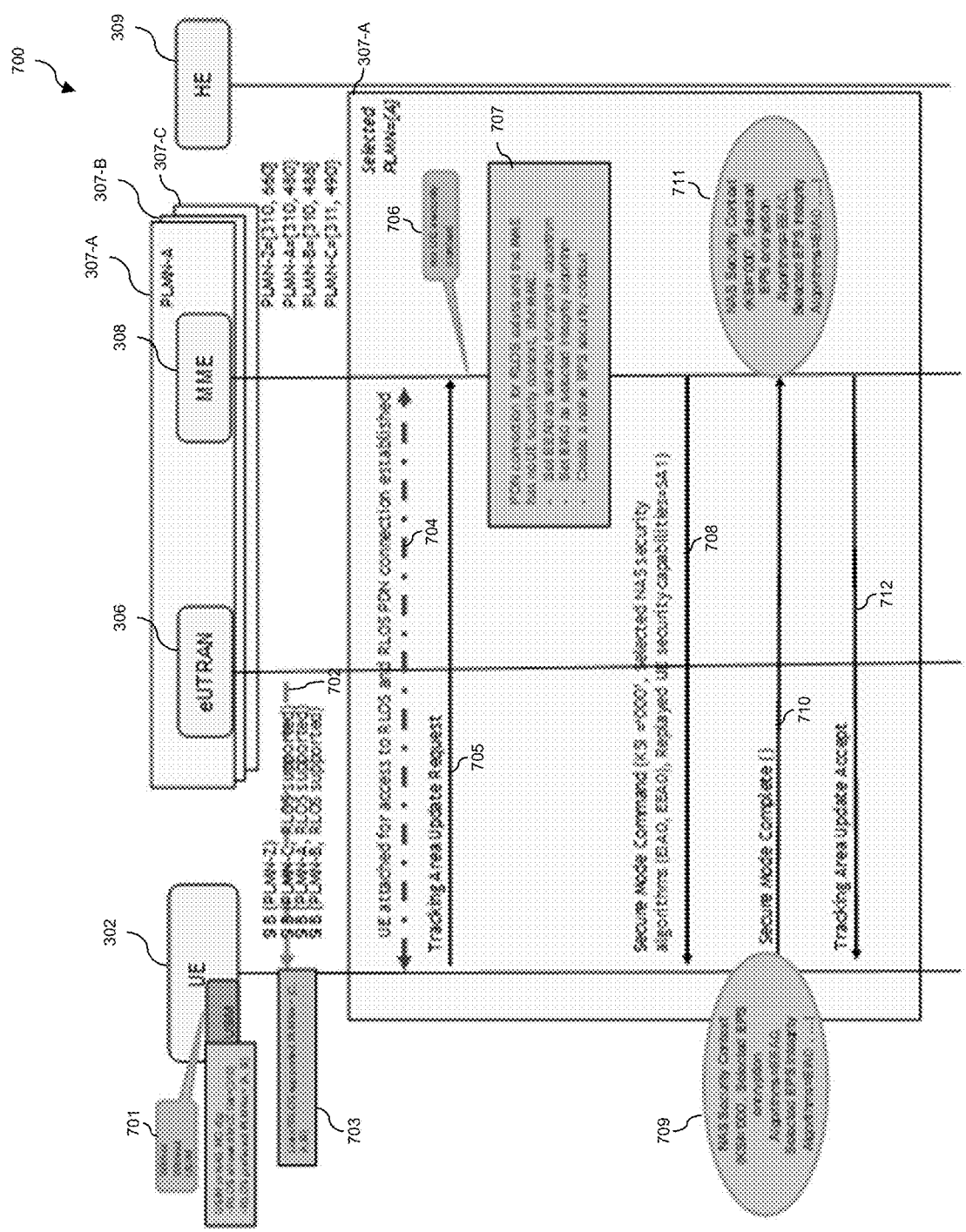
FIG. 7 illustrates a process flow for accessing restricted local operator services during a tracking area update, according to an illustrative embodiment.
Figure 8:
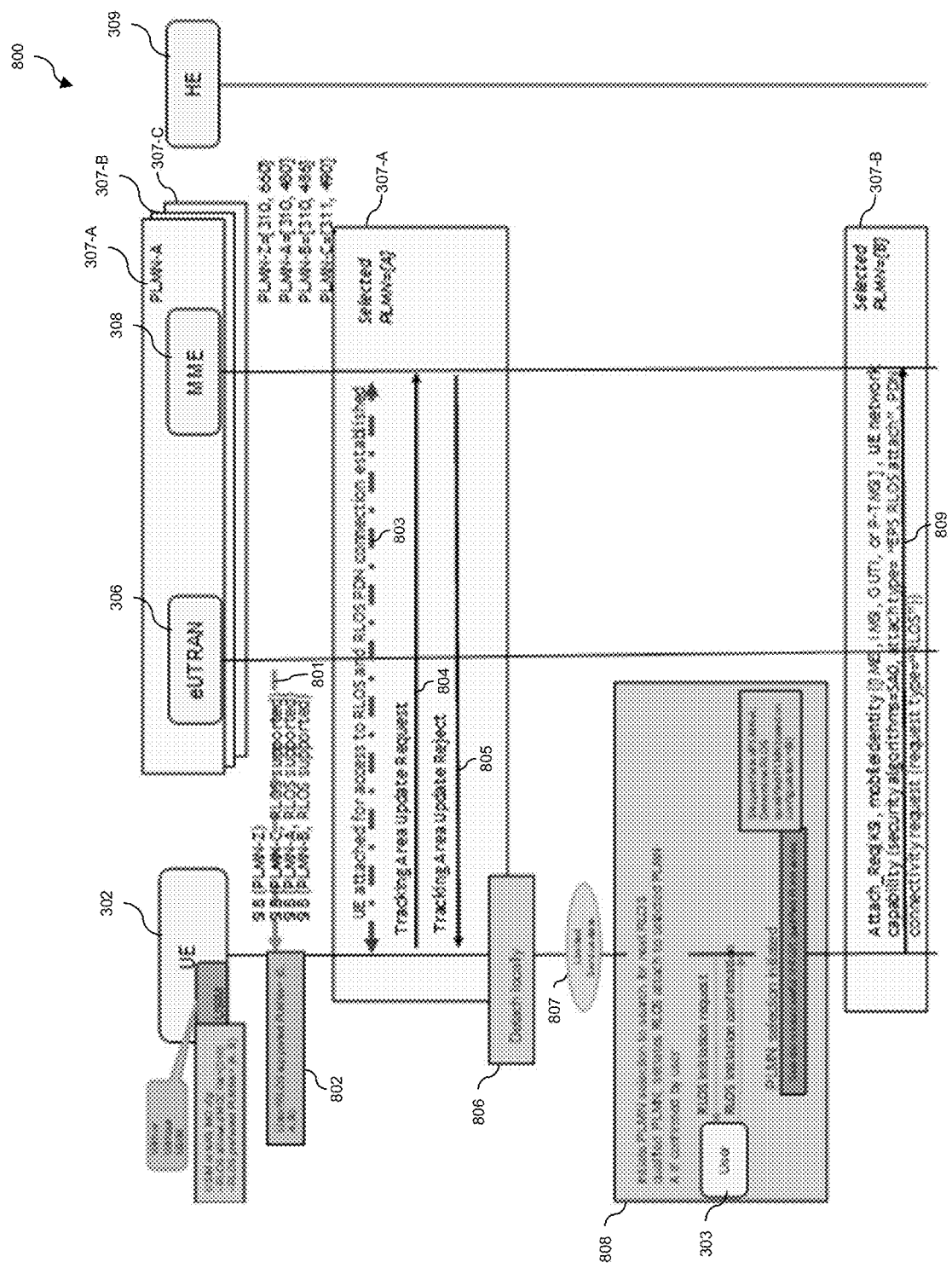
FIG. 8 illustrates a process flow for tracking area update request failure during restricted local operator services access, according to an illustrative embodiment.

FIGS. 7 and 8 illustrate failure handling related to a TAU request, with FIG. 7 detailing a procedure for handling when there is no security context during TAU request for the UE 302 with a PDN connection for access to RLOS and FIG. 8 detailing a procedure for handling TAU failure for the UE 302 with a PDN connection for access to RLOS.

Figure 9:
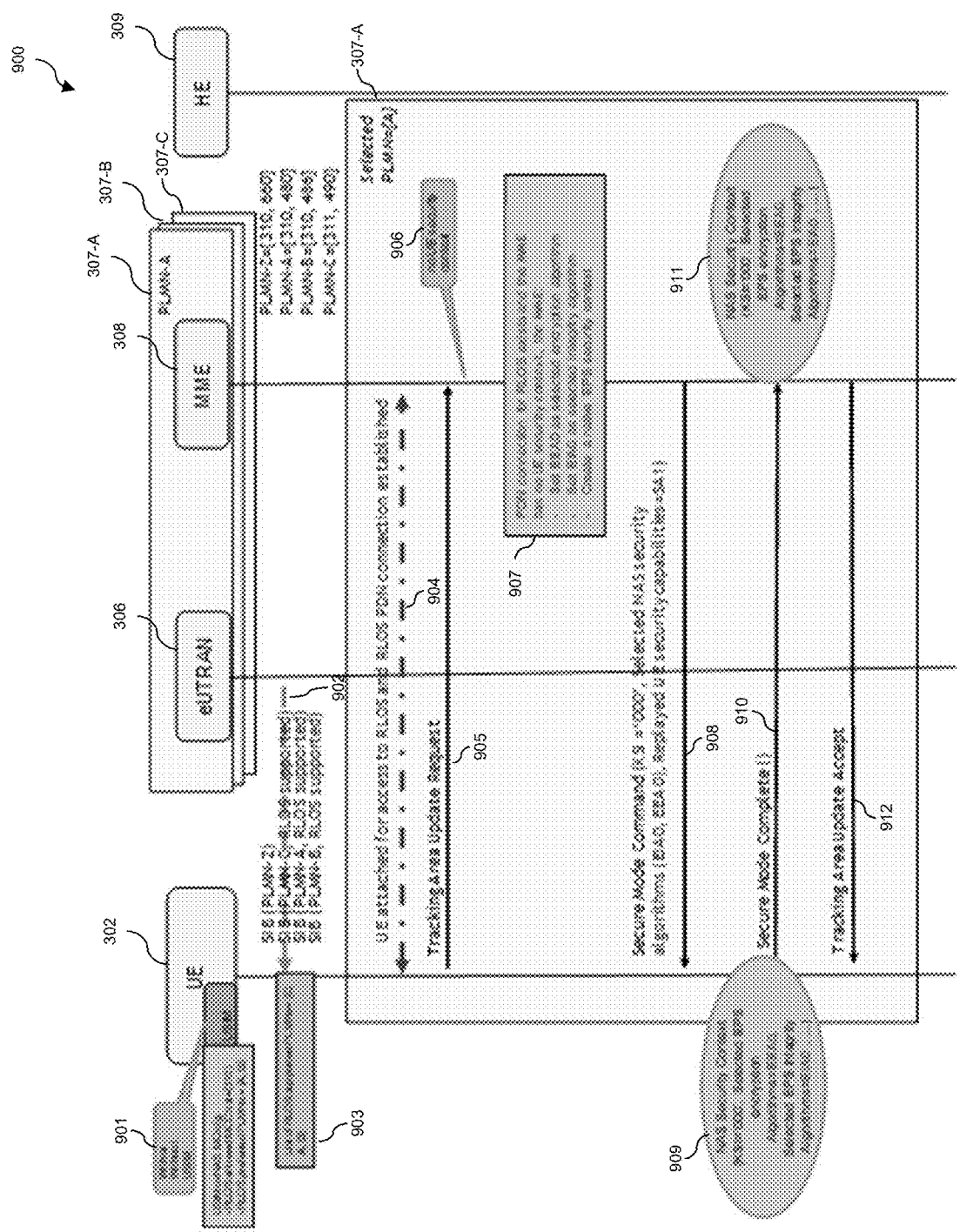
FIG. 9 illustrates a process flow for accessing restricted local operator services during a service request, according to an illustrative embodiment.
Figure 10:
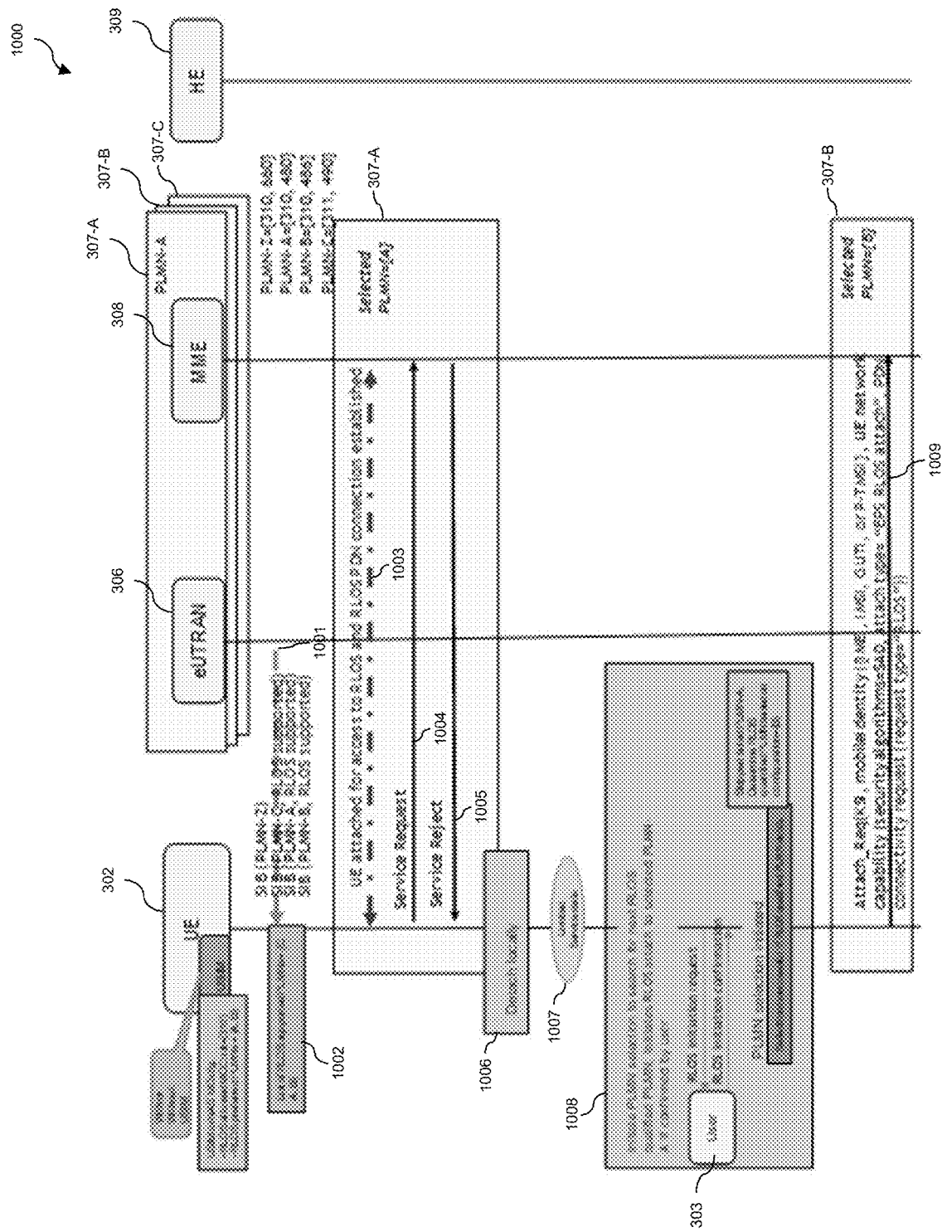
FIG. 10 illustrates a process flow for service request failure during restricted local operator services access, according to an illustrative embodiment.

FIGS. 9 and 10 illustrate failure handling related to a service request, with FIG. 9 detailing a procedure for handling when there is no security context during a service request for the UE 302 with a PDN connection for access to RLOS and FIG. 10 detailing a procedure for handling a service request failure for the UE 302 with a PDN connection for access to RLOS.

Figure 11:
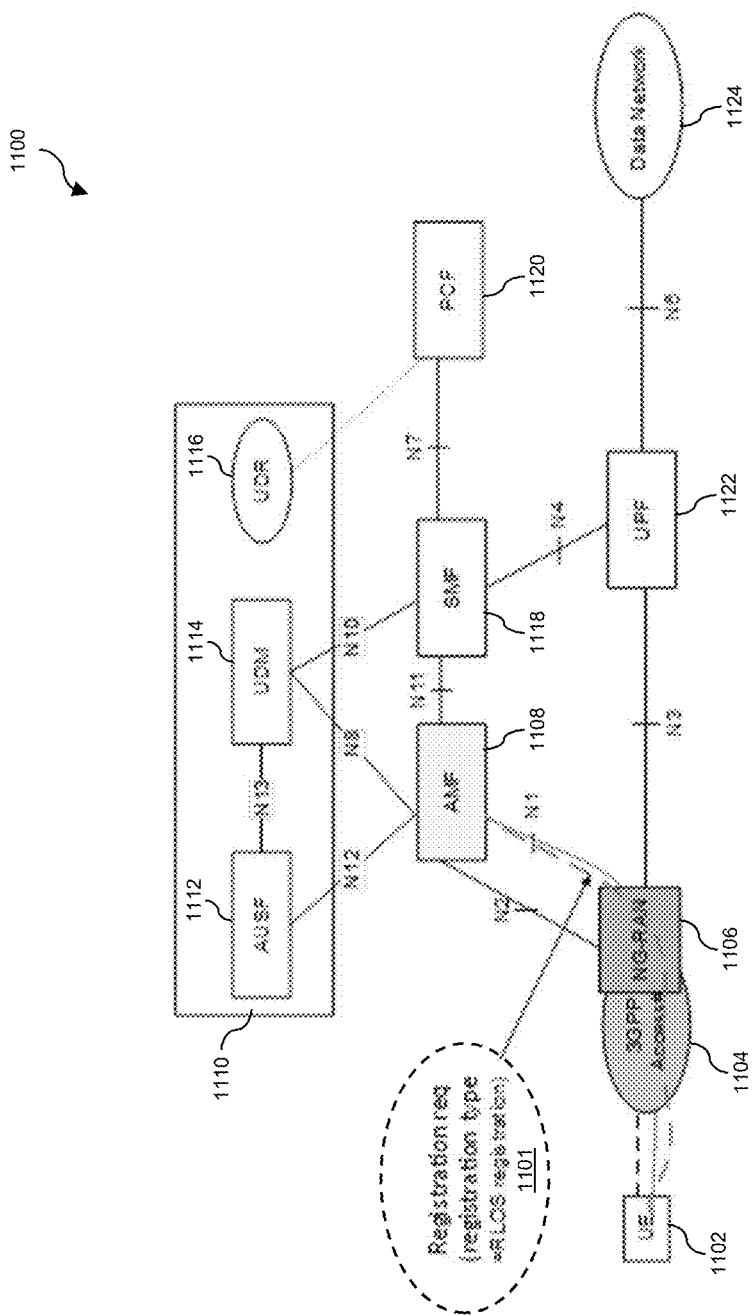
FIG. 11 illustrates part of another communication system, with which one or more illustrative embodiments are implemented, where user equipment attaches to a network with a restricted local operator services indication.
Figure 12:
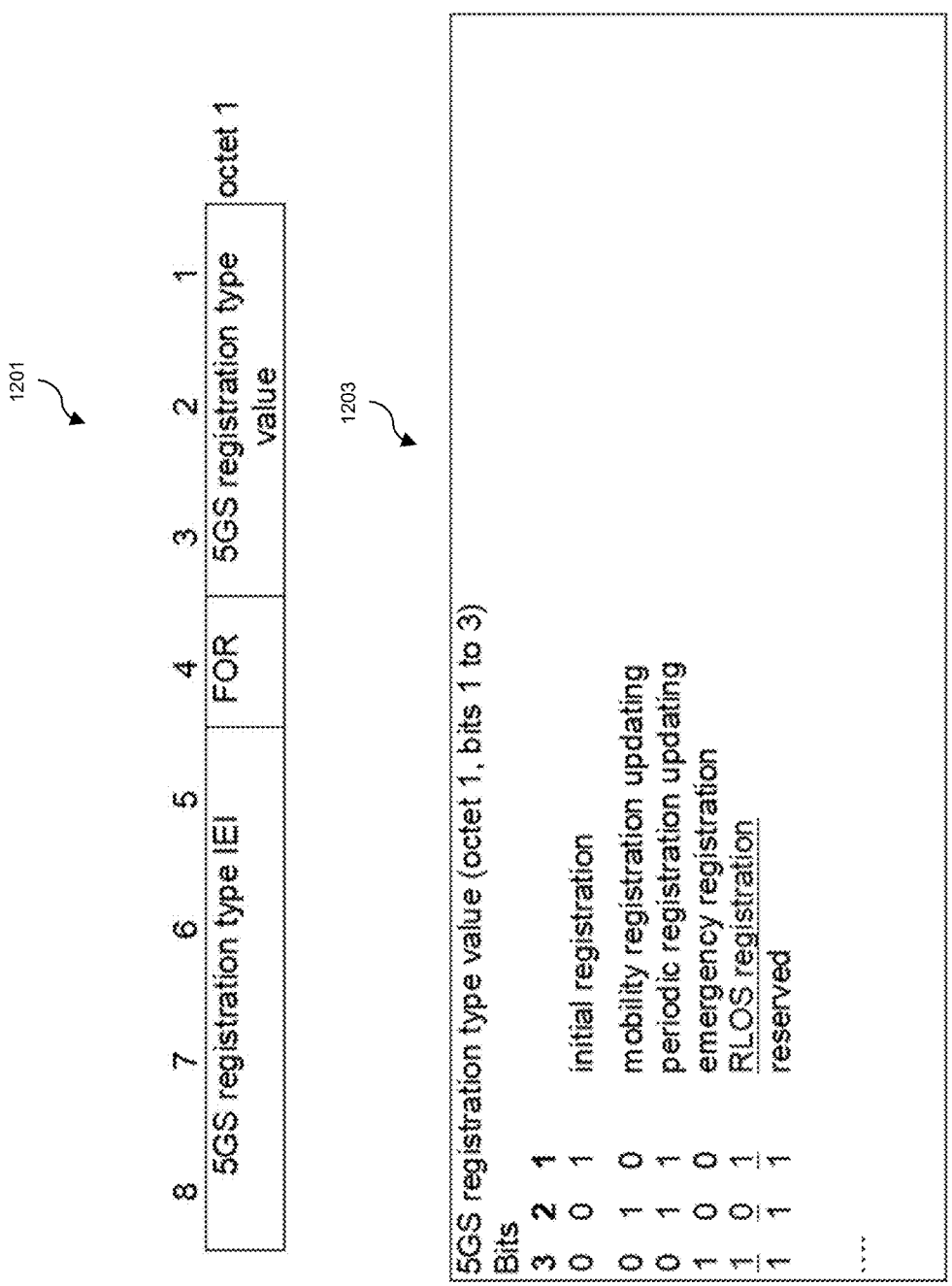
FIG. 12 illustrates a registration type information element for indicating restricted local operator services registration, according to an illustrative embodiment.

Similar RLOS access requirements and failure cases are applicable to 5G networks, and corresponding handling needs to be specified. Such techniques will be described in further detail below with respect to FIGS. 11-19. More particularly, FIG. 11 illustrates a communication system 1100, where a UE 1102 indicates an RLOS registration type 1101 when accessing a 5G core network via 3GPP access, and FIG. 12 illustrates a registration type Information Element (IE).

Figure 13:
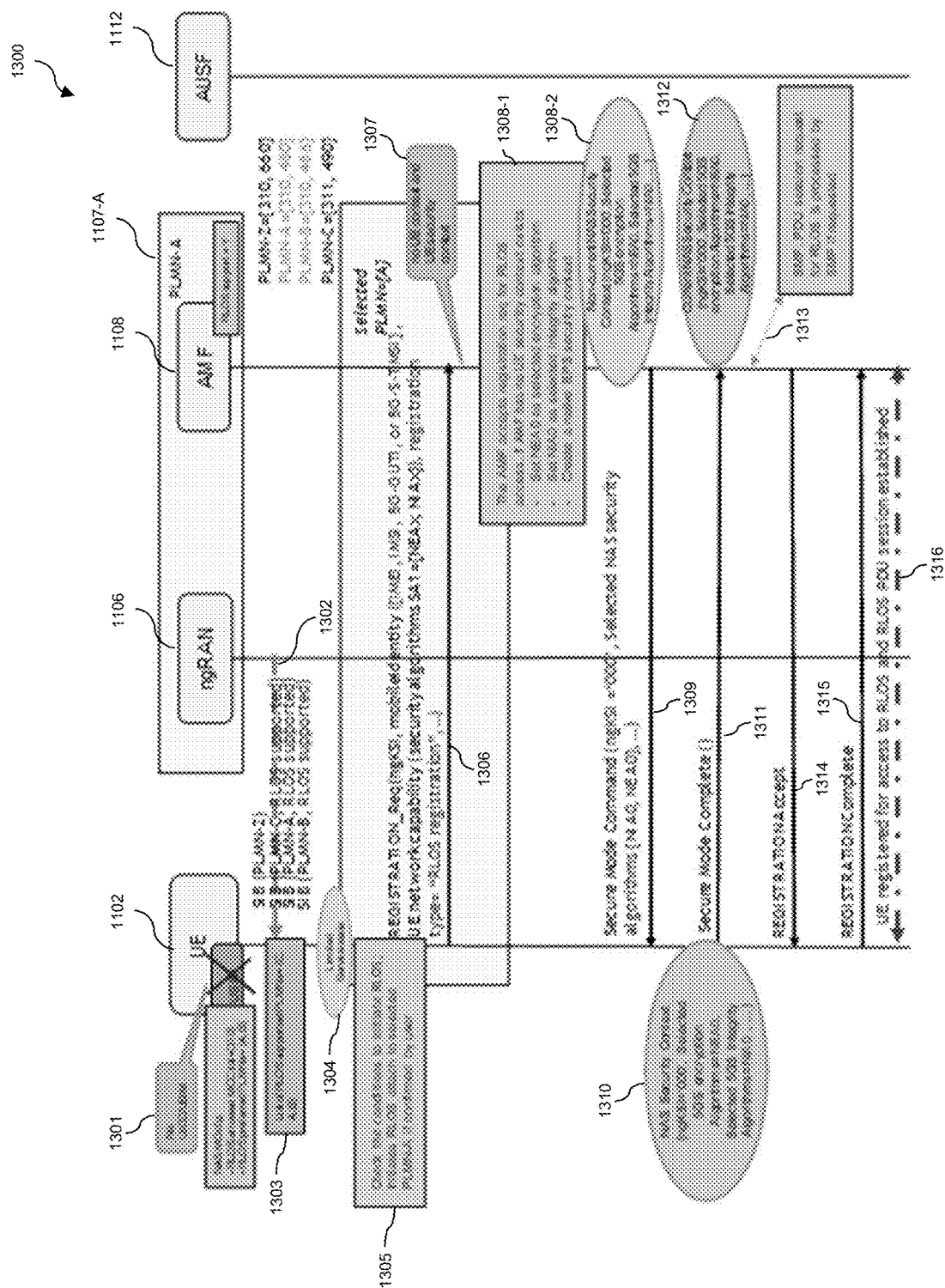
FIG. 13 illustrates a process flow for selection of security algorithms during restricted local operator services access, according to an illustrative embodiment.
Figure 14:
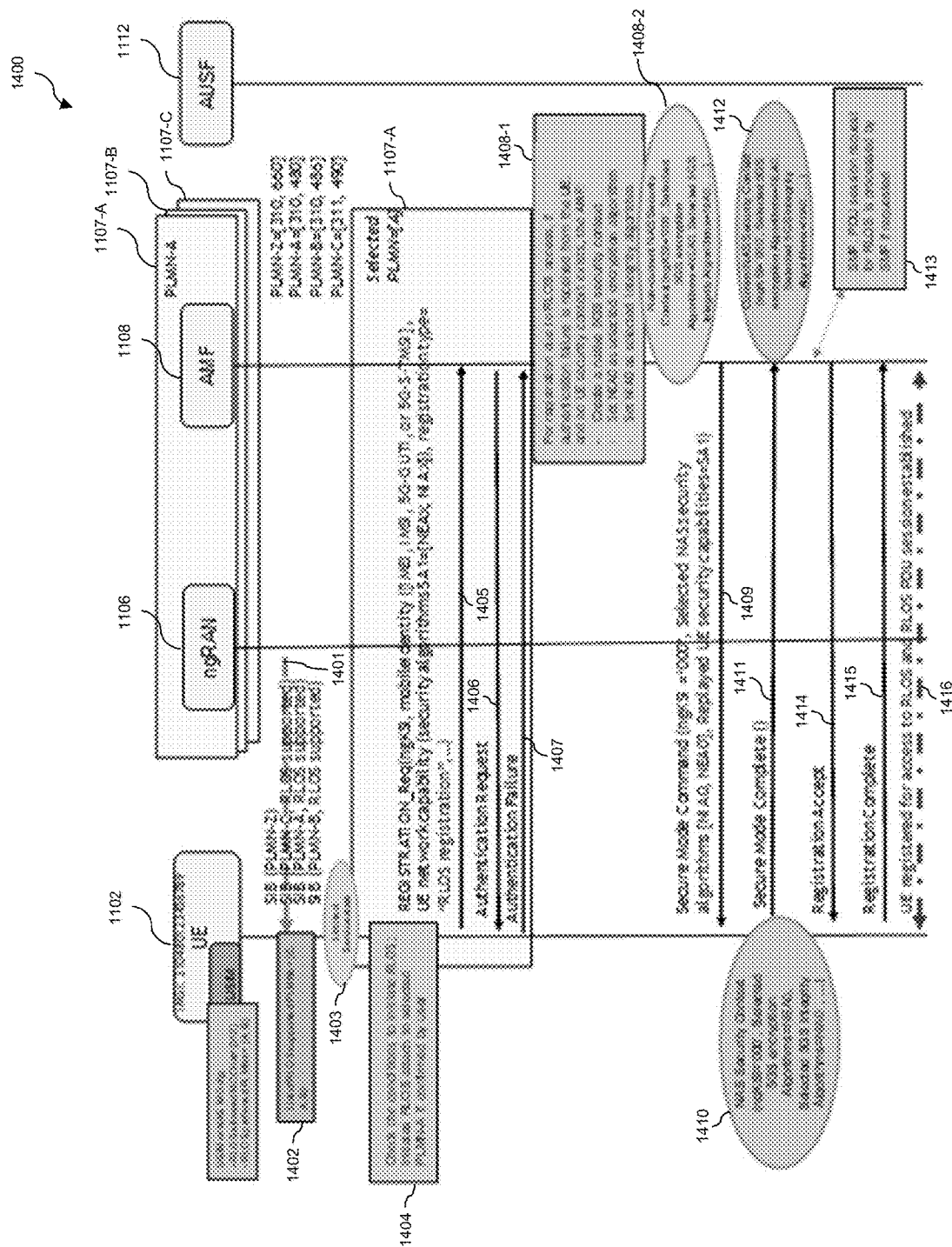
FIG. 14 illustrates a process flow for authentication failure indicated by user equipment during a restricted local operator services registration, according to an illustrative embodiment.
Figure 15:
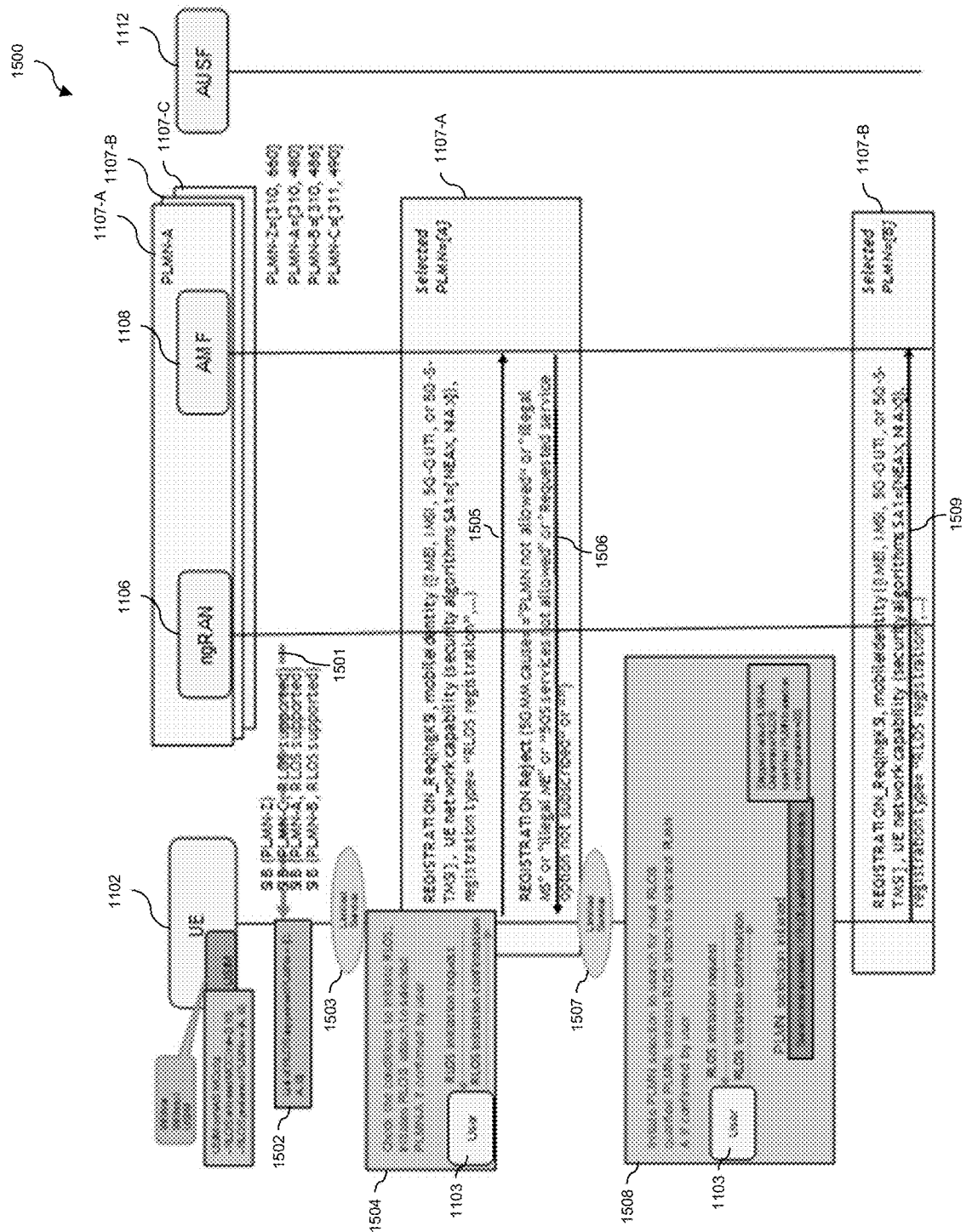
FIG. 15 illustrates a process flow for a communication system rejecting a restricted local operator services registration, according to an illustrative embodiment.

FIGS. 13-15 illustrate RLOS connection establishment in a 5G network, with FIG. 13 detailing a procedure for handling a UE 1102 with no security context during UE registration for RLOS attach to 5G network, FIG. 14 detailing a procedure for handling authentication failure received from the UE 1102 during UE registration for RLOS attach, and FIG. 15 detailing a procedure for handling UE 1102 registration for RLOS attach rejected by the network.

Figure 16:
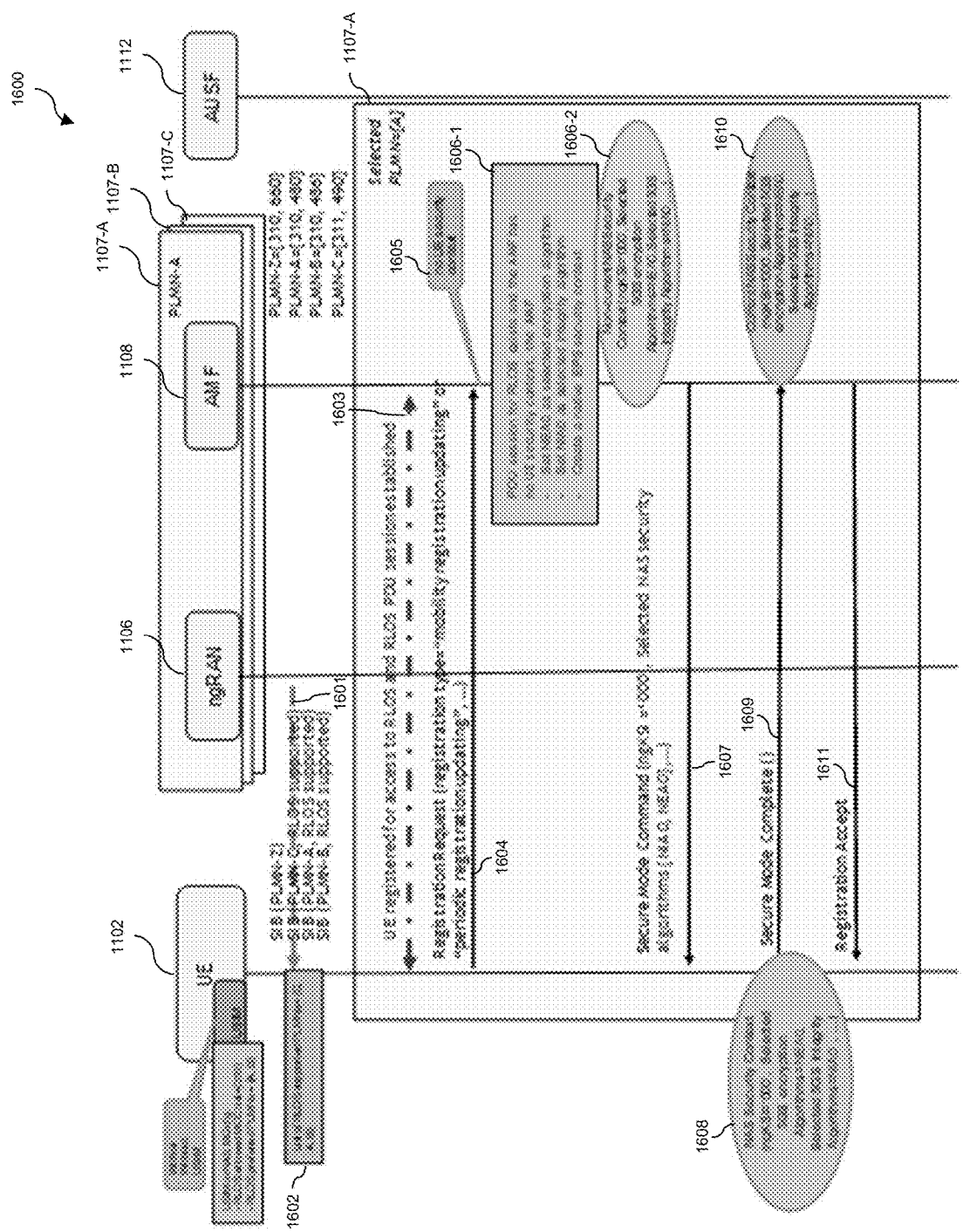
FIG. 16 illustrates a process flow for accessing restricted local operator services during a registration request, according to an illustrative embodiment.
Figure 17:
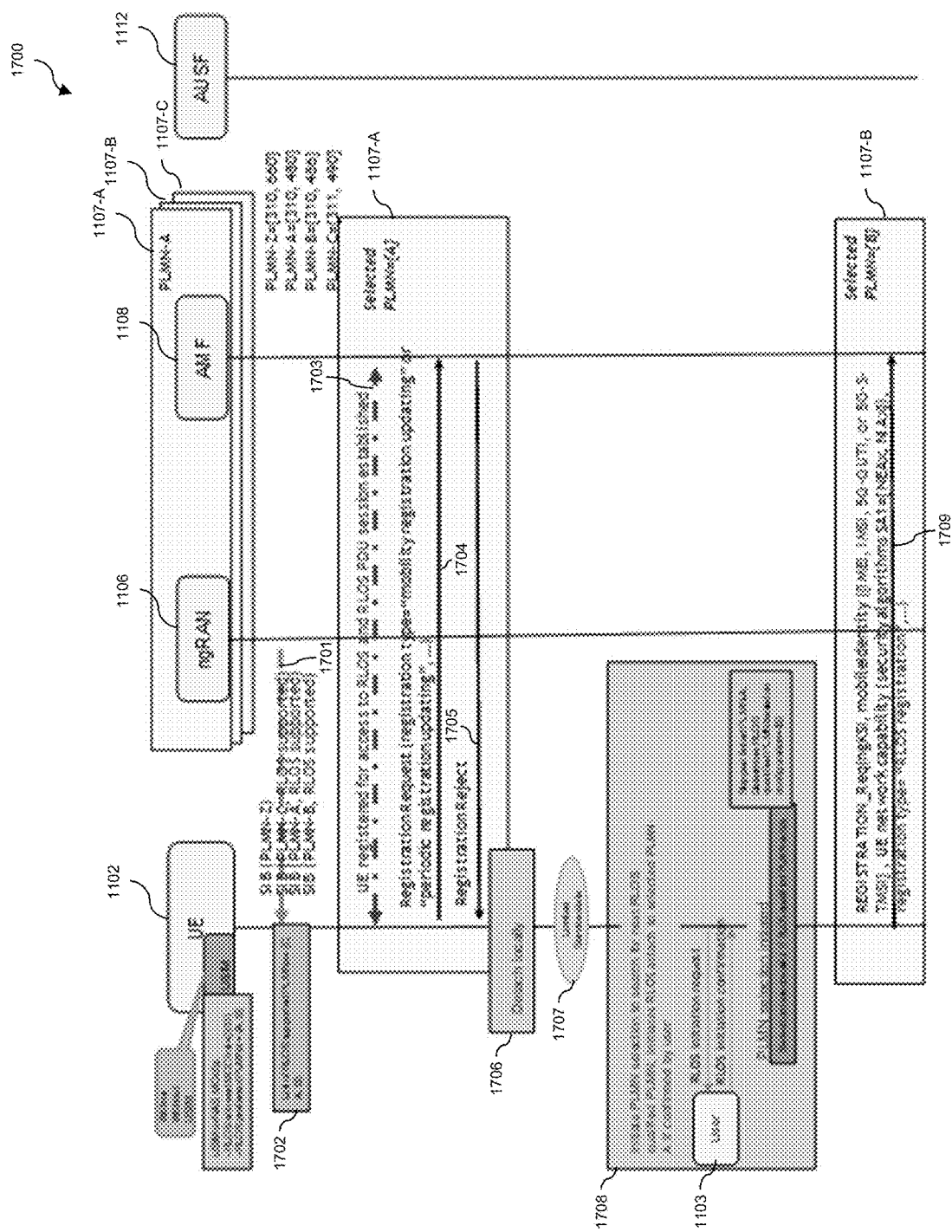
FIG. 17 illustrates a process flow for registration failure during restricted local operator services access, according to an illustrative embodiment.

FIGS. 16 and 17 illustrate failure handling related to a UE registration request for UE 1102 with a RLOS PDU session, with FIG. 16 detailing a procedure for handling a UE 1102 with no security context during registration with a RLOS PDU session and FIG. 17 detailing a procedure for handling registration failure for the UE 1102 with a RLOS PDU session.

Figure 18:
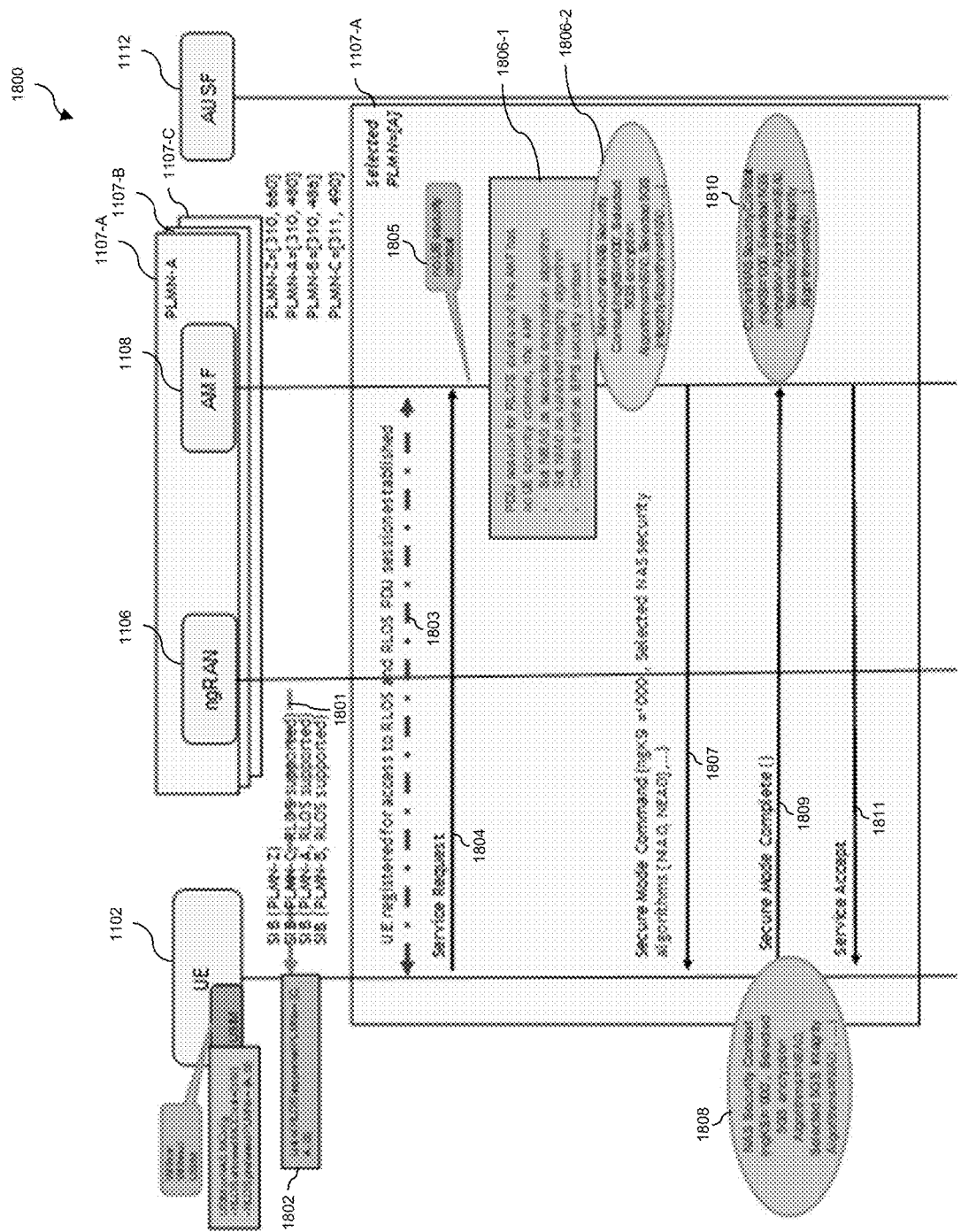
FIG. 18 illustrates a process flow for accessing restricted local operator services during a service request, according to an illustrative embodiment.
Figure 19:
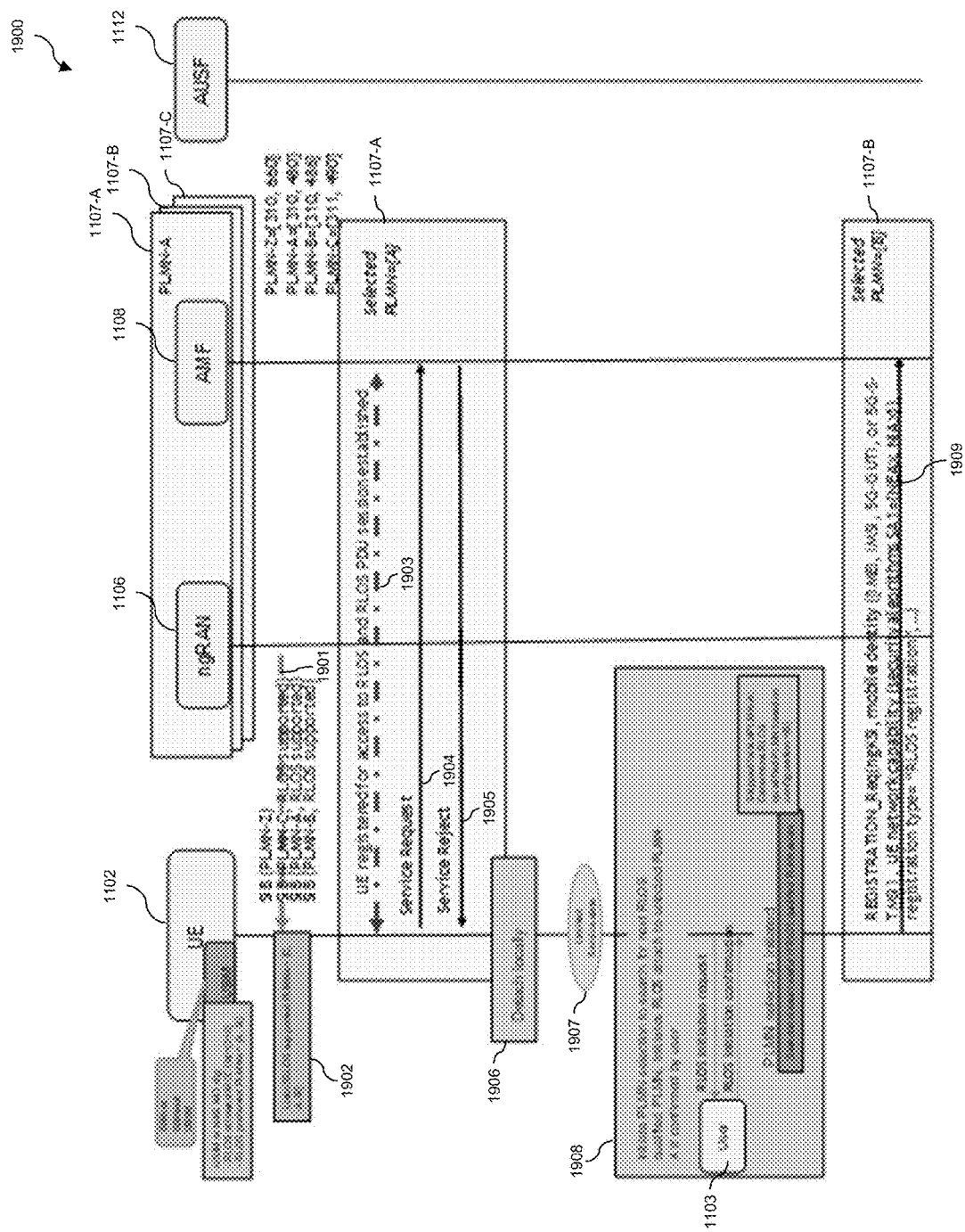
FIG. 19 illustrates a process flow for service request failure during restricted local operator services access, according to an illustrative embodiment.

FIGS. 18 and 19 illustrate failure handling related to a service request, with FIG. 18 detailing a procedure for handling a UE 1102 with no security context during service request with a RLOS PDU session and FIG. 19 detailing a procedure for handling service request failure for UE 1102 with a RLOS PDU session.

FIGS. 20-23 detail a non-access stratum (NAS) configuration Management Object (MO) as well as UICC/USIM configuration.

Techniques for handling RLOS connection establishment in a 4G EPC network will now be described in further detail below with respect to FIGS. 4-6. FIG. 4 illustrates a process flow 400 for handling when the UE 302 has no UICC/USIM or no security context during RLOS attach to the 4G EPC network.

Several situations could result in the UE 302 having no security context. For example, when the UE 302 does not have a UICC, the UE 302 has no IMSI and is not able to perform required authentication procedures. As another example, the UE 302 may have a UICC, but indicate EPS encryption algorithms and/or EPS integrity algorithms that are not acceptable by the network due to various reasons (e.g., mandatory EPS encryption algorithms are not supported by the UE 302, mandatory EPS integrity algorithms are not supported by the UE 302, etc.). The process flow 400 illustrates a procedure and handling on the MME 308 side when the UE 302 initiates RLOS attach to a 4G EPC network and the MME 308 has no UE context or UE security context for the UE 302.

FIG. 4 illustrates a scenario where the UE 302 has no UICC/USIM, and where the UE has a NAS MO configuration specifying a RLOS allowed MCC list of {3 1 0} and a RLOS preferred PLMN list of {A B}. Details regarding the NAS MO configuration will be described below in conjunction with FIGS. 20-23. It is assumed, in the FIG. 4 example, that the UE 302 has no UICC/USIM in step 401. In step 402, the UE 302 receives a broadcast system information with a list of PLMNs (e.g., PLMNs A, B, C, . . . Z), indicating whether each of the PLMNs support RLOS. This information is delivered to the EPS Mobility Management (EMM) layer in the UE 302. The UE 302 forms a list of RLOS supported PLMNs in step 403. In the FIG. 4 example, the list of RLOS supported PLMNs is {PLMN-C, PLMN-A, PLMN-B}.

In step 404, the UE 302 is in limited service state. The UE 302 checks conditions for triggering UE access to RLOS in step 405 and, if conditions are satisfied and confirmed by the user, the UE 302 initiates an RLOS attach to a selected PLMN (e.g., to PLMN-A 307-A in the FIG. 4 example) in step 405. The UE 302 may initiate automatic or manual PLMN selection. The UE 302 initiates a request to the user (e.g., of the UE 302) for consent to initiate connection for access to RLOS. If the user provides consent for access to RLOS and the UE 302 is set to automatic PLMN selection, the UE 302 proceeds to determine RLOS qualified PLMN for access to RLOS as follows. If at least one preferred PLMN exists based on the RLOS preferred PLMN list configured in the USIM or in the NAS configuration MO in the ME and the MCC part of the preferred PLMN is present in the RLOS allowed MCC list configured in the USIM or NAS configuration MO, the UE 302 selects the preferred PLMN offering access to RLOS and indicates the selected preferred PLMN for access to RLOS. If none of the preferred PLMNs for access to RLOS are available, the UE 302 evaluates the remaining PLMNs offering access to RLOS that are not in the RLOS preferred PLMN list. If the MCC part of a PLMN is present in the RLOS allowed MCC list configured in the USIM or NAS configuration MO, the UE 302 selects this PLMN and indicates the selected PLMN for access to RLOS. In the FIG. 4 example, PLMN-A 307-A is in the RLOS preferred PLMN list and also the MCC of PLMN-A 307-A is in the RLOS allowed MCC list {310}, so PLMN-A 307-A is the selected PLMN for the UE 302 to initiate access to RLOS.

If the user provides consent for access to RLOS and the UE 302 is set to perform manual PLMN selection, the UE 302 proceeds to determine RLOS qualified PLMN for access to RLOS and presents to the user the PLMNs offering access to RLOS in the following order: (i) PLMNs contained in the RLOS preferred PLMN list configured in the USIM or in the ME if the MCC part of the preferred PLMN is present in the RLOS allowed MCC list configured in the USIM or in the ME; and (ii) any of the remaining PLMNs offering access to RLOS that are not in the RLOS preferred PLMN list if the MCC part of the PLMN is present in the RLOS allowed MCC list configured in the USIM or in the ME. Upon selection of a PLMN by the user, the UE 302 proceeds with initiating access to RLOS.

In the FIG. 4 example, it is assumed that the automatic or manual PLMN selection process results in selecting PLMN 307-A, and the UE 302 in step 406 requests access restricted local operator services by initiating an attach request to the MME of the selected PLMN 307-A with the attach type indicating "EPS RLOS attach" in the ATTACH REQUEST message. The step 406 attach request may also include: a Key Set Identifier (KSI); a mobile identity including an International Mobile Equipment Identity (IMEI), an IMSI, a Globally Unique Temporary Identifier (GUTI) or a Packet Temporary Mobile Subscriber Identity (P-TMSI); UE network capabilities, including security algorithms such as SA1={EPS Encryption Algorithm (EEA), EPS Integrity Algorithm (EIA)}; the attach type of "EPS RLOS attach"; and a PDN connectivity request with request type of "RLOS".

If the MME 308 is configured to support RLOS, the MME 308 accepts the UE 302 attach request regardless of the authentication result, or skips the authentication procedure. In the FIG. 4 example, it is assumed that the MME 308 supports RLOS. The MME 308 determines that there is no UE context or UE security context for UE 302 in step 407. In step 408-1, the MME 308 accepts the attach request for RLOS access. As part of step 408-1, the MME 308 sets EEA0 as the selected encryption algorithm and EIA0 as the selected integrity algorithm, and creates a native EPS security context. If no valid EPS security context is available, the MME 308 creates a locally generated $K_{ASME}$ and native non-current EPS security context with EEA0 as the selected encryption algorithm and EIA0 as the selected integrity algorithm in step 408-2. The MME in step 409 sends a secure mode command (e.g., a SECURITY MODE COMMAND) message. The secure mode command message includes parameters of KSI='000', the selected NAS security algorithms (e.g., EIA0, EEA0), and replayed UE security capabilities (e.g., SA1).

The MME 308 takes the newly created security context into usage by initiating the secure mode command procedure in step 409. The MME 308 resets the downlink NAS COUNT counter and uses it to integrity protect the initial secure mode command message. Upon receiving the secure mode command message including a KSI value in the NAS key set identifier IE set to "000" and EIA0 and EEA0 as the selected NAS security algorithms, the UE 302 creates a locally generated $K_{ASME}$ and an EPS security context based on the selected security algorithm {EEA0, EIA0} in step 410. The UE 302 in step 411 sends a secure mode complete message to the MME 308, and the new NAS security context is put into use in step 412. The MME 308 processes the piggybacked PDN connectivity request in step 413 to create a PDN connection for RLOS. The MME 308 sends an attach accept message to the UE 302 in step 414, and the UE 302 responds to the MME 308 with an attach complete message in step 415. After the attach procedure is completed, the UE 302 is attached for access to RLOS and the RLOS PDN connection is established in step 416.

Various conditions may trigger UE access to RLOS if the UE 302 has a UICC/USIM, such as the UE 302 is in limited service state and UE registration cannot be achieved on any PLMN, the UE 302 supports access to RLOS, and one or more PLMNs offering access to RLOS has been found, with one of the following being true: RLOS allowed MCC list is not configured on either USIM or NAS configuration MO; RLOS allowed MCC list is configured on either USIM or NAS configuration MO, but the list is empty; RLOS allowed MCC list is configured in either USIM or NAS configuration MO, the list is not empty, and the MCC part of the IMSI in the USIM is present in the RLOS allowed MCC list configured in the USIM; or RLOS allowed MCC list is configured in both USIM and NAS configuration MO, the RLOS allowed MCC list configured in USIM is not empty, and the MCC part of the IMSI is present in the RLOS allowed MCC list configured in the USIM. It should be noted that, if the RLOS allowed MCC list is configured in both USIM and NAS configuration MO, the list configured in the USIM takes priority over the list configured in the NAS configuration MO on the ME.

Various conditions may also trigger UE access to RLOS if the UE 302 does not have UICC/USIM (e.g., a UICC-less UE), such as if the UE 302 is in limited service state and UE registration cannot be achieved on any PLMN, the UE 302 supports access to RLOS, and the list of RLOS supported PLMNs is not empty (e.g., one or more PLMNs offering access to RLOS have been found). If the conditions are satisfied, the UE 302 initiates a PLMN selection procedure to find a RLOS qualified PLMN for UE access to RLOS.

FIG. 5 illustrates a process flow 500 for handling by the MME 308 when the UE 302 initiates RLOS attach to the 4G EPC network and the UE 302 indicates authentication failure or reject. The process flow 500 begins with the UE 302 being set in PLMN selection mode, with the UE 302 supporting RLOS access and being configured with a RLOS allowed MCC list of {3 1 0} and a RLOS preferred PLMN list of {A B}, either in USIM EF file or NAS configuration MO. Details regarding the NAS MO configuration will be described below in conjunction with FIGS. 20-23. In step 501, the UE 302 receives a broadcast system information with a list of PLMNs (e.g., PLMNs A, B, C, . . . Z), indicating whether each of the PLMNs support RLOS. This information is delivered to the EPS Mobility Management (EMM) layer in the UE 302. The UE 302 forms a list of RLOS supported PLMNs in step 502. In the FIG. 5 example, the list of RLOS supported PLMNs is {PLMN-C, PLMN-A, PLMN-B}.

The UE 302 is assumed to have a UICC card containing a USIM, and that the UE 302 is in a limited service state in step 503. The UE 302 checks conditions for triggering UE access to RLOS as specified above. If conditions are satisfied, such as where the UE 302 has an IMSI MCC=310 which is in the allowed MCC list, the UE 302 initiates automatic PLMN selection process for RLOS access in step 504, based on the list of RLOS supported PLMN formed in step 502. The UE 302 initiates a request to the user (e.g., of the UE 302) for consent to initiate connection for access to RLOS. If the user provides consent for access to RLOS and the UE 302 is set to automatic PLMN selection, the UE 302 proceeds to determine RLOS qualified PLMN for access to RLOS as follows. If at least one preferred PLMN exists based on the RLOS preferred PLMN list configured in the USIM or in the NAS configuration MO in the ME and the MCC part of the preferred PLMN is present in the RLOS allowed MCC list configured in the USIM or NAS configuration MO, the UE 302 selects the preferred PLMN offering access to RLOS and indicates the selected preferred PLMN for access to RLOS. If none of the preferred PLMNs for access to RLOS are available, the UE 302 evaluates the remaining PLMNs offering access to RLOS that are not in the RLOS preferred PLMN list. If the MCC part of a PLMN is present in the RLOS allowed MCC list configured in the USIM or NAS configuration MO, the UE 302 selects this PLMN and indicates the selected PLMN for access to RLOS. In the FIG. 5 example, PLMN-A 307-A is in the RLOS preferred PLMN list and also the MCC of PLMN-A 307-A is in the RLOS allowed MCC list {310}, so PLMN-A 307-A is the selected PLMN for the UE 302 to initiate access to RLOS.

If the user provides consent for access to RLOS and the UE 302 is set to perform manual PLMN selection, the UE 302 proceeds to determine RLOS qualified PLMN for access to RLOS and presents to the user the PLMNs offering access to RLOS in the following order: (i) PLMNs contained in the RLOS preferred PLMN list configured in the USIM or in the ME if the MCC part of the preferred PLMN is present in the RLOS allowed MCC list configured in the USIM or in the ME; and (ii) any of the remaining PLMNs offering access to RLOS that are not in the RLOS preferred PLMN list if the MCC part of the PLMN is present in the RLOS allowed MCC list configured in the USIM or in the ME. Upon selection of a PLMN by the user, the UE 302 proceeds with step 505.

In the FIG. 5 example, it is assumed that the automatic or manual PLMN selection process results in selecting PLMN 307-A, and the UE 302 in step 505 initiates RLOS attach to the RLOS qualified PLMN-A 307-A with the attach type indicating "EPS RLOS attach" in the attach request message. When the UE 302 initiates attaching to selected PLMN, the UE 302 uses IMEI as EPS mobile identity if the UE 302 has no valid GUTI, P-TMSI or IMSI. The step 505 attach request may also include: a KSI; a mobile identity including an IMEI, an IMSI, a GUTI or a P-TMSI; UE network capabilities, including security algorithms such as SA1={an EEA algorithm $EEA_x$, an EIA algorithm $EIA_x$}; the attach type of "EPS RLOS attach"; and a PDN connectivity request with request type of "RLOS".

The MME 308 in step 506 initiates an authentication procedure with the UE 302. In step 507, the UE 302 indicates authentication failure to the MME 308. If the MME 308 is configured to support RLOS and decides to the RLOS request, the MME 308 accepts the UE's attach request regardless of the authentication result. If no valid EPS security context is available, the MME 308 in step 508-1 creates a locally generated $K_{ASME}$ and native non-current EPS security context with EEA0 as selected encryption algorithm and EIA0 as selected integrity algorithm.

The MME 308 takes the newly created security context into use in step 508-2 and initiates a secure mode command procedure. The MME 308 resets the downlink NAS COUNT counter and uses it to integrity protect the initial secure mode command message. The MME 308 in step 509 sends the secure mode command message to the UE 302. The secure mode command message includes a KSI value in the NAS key set identifier IE set to "000" and EIA0 and EEA0 as the selected NAS security algorithms. The UE 302 in step 510 creates a locally generated $K_{ASME}$ and an EPS security context based on the selected security algorithm {EEA0, EIA0}. THE UE 302 in step 511 sends a secure mode complete message to the MME 308, and the new NAS security context is put into use in step 512. The MME 308 processes the piggybacked PDN connectivity request in step 513 to create a PDN connection for RLOS. The MME 308 sends an attach accept message to the UE 302 in step 514, and the UE 302 responds to the MME 308 with an attach complete message in step 515. After the attach procedure is completed, the UE 302 is attached for access to RLOS and the RLOS PDN connection is established in step 516.

Conditions for triggering UE 302 for access to RLOS in some embodiments are as follows. If the UE 302 has a UICC/USIM, the conditions for triggering UE access to RLOS include the UE 302 being in limited service state, UE registration cannot be achieved on any PLMN, the UE 302 supports access to RLOS, one or more PLMNs offering access to RLOS have been found, and one of the following is true: RLOS allowed MCC list is not configured on either USIM or NAS configuration MO; RLOS allowed MCC list is configured on either USIM or NAS configuration MO, but the list is empty; RLOS allowed MCC list is configured in either USIM or NAS configuration MO, the list is not empty, and the MCC part of the IMSI in the USIM is present in the RLOS allowed MCC list configured in the USIM; or the RLOS allowed MCC list is configured in both USIM and NAS configuration MO, the RLOS allowed MCC list configured in USIM is not empty, and the MCC part of the IMSI is present in the RLOS allowed MCC list configured in the USIM. If the RLOS allowed MCC list is configured in both USIM and NAS configuration MO, the list configured in configured in USIM takes priority over the list configured in configured in NAS configuration MO on the ME. If the UE 302 does not have a UICC/USIM (e.g., UICC-less UE), the conditions for triggering UE access to RLOS include the UE being in limited service state and UE registration cannot be achieved on any PLMN, the UE supports access to RLOS, and a list of RLOS supported PLMNs is not empty (e.g., one or more PLMNs offering access to RLOS has been found). If the conditions are satisfied, the UE 302 initiates PLMN selection procedure to find a RLOS qualified PLMN for UE access to RLOS.

FIG. 6 illustrates a process flow 600 for handling by the MME 308 when the UE 302 initiates RLOS attach to the 4G EPC network and the MME 308 rejects the attach from the UE 302. Conditions for triggering the UE access to RLOS are determined as described above. If the conditions are satisfied, the UE 302 initiates a PLMN selection procedure to find a RLOS qualified PLMN for UE access to RLOS. Similar to the process flow 500 of FIG. 5 described above, the UE 302 may be set in either automatic or manual PLMN selection mode. It is further assumed that the UE 302 supports RLOS access and has been configured with a RLOS allowed MCC list and a RLOS preferred PLMN list, either in a USIM EF file or NAS configuration MO.

In step 601, the UE 302 receives broadcast system information from the roaming network, indicating whether each of the PLMNs supports RLOS. The information is delivered to the EMM layer in the UE 302. The UE 302 forms a list of RLOS supported PLMNs in step 602. In the FIG. 6 example, the list of RLOS supported PLMNs is {PLMN-C, PLMN-A, PLMN-B}. The UE 302 is in a limited service state in step 603, and in step 604 checks conditions for triggering the UE 302 for access to RLOS as specified above. It is assumed in FIG. 6 that the conditions are satisfied (e.g., including that the IMSI of the UE 302 has a MCC=310 which is in the list of allowed MCC list), the UE 302 initiates a PLMN selection process for RLOS access based on the list of RLOS supported PLMN list received in step 601.

As part of step 604, the UE 302 initiates a request to the user 303 for consent to initiate connection for access to RLOS. If the user provides consent for access to RLOS and the UE 302 is set to automatic PLMN selection, the UE 302 proceeds to determine RLOS qualified PLMN for access to RLOS as follows. If at least one preferred PLMN exists based on the RLOS preferred PLMN list configured in the USIM or in the NAS configuration MO in the ME and the MCC part of the preferred PLMN is present in the RLOS allowed MCC list configured in the USIM or NAS configuration MO, the UE 302 selects the preferred PLMN offering access to RLOS and indicates the selected preferred PLMN for access to RLOS. If none of the preferred PLMNs for access to RLOS is available, the UE 302 evaluates the remaining PLMNs offering access to RLOS that are not in the RLOS preferred PLMN list. If the MCC part of a PLMN is present in the RLOS allowed MCC list configured in the USIM or NAS configuration MO, the UE 302 selects this PLMN and indicates the selected PLMN for access to RLOS. In the FIG. 6 example, the PLMN-A 307-A is in the RLOS preferred PLMN list, and the MCC of PLMN-A 307-A is in the RLOS allowed MCC list {310}, so PLMN-A 307-A is the selected PLMN for the UE 302 to initiate access to RLOS. Although PLMN-C 307-C also supports RLOS access, its MCC {311} is not in the RLOS allowed MCC list, and thus is not selected.

If the user provides consent for access to RLOS and the UE 302 is set to perform manual PLMN selection, the UE 302 proceeds to determine RLOS qualified PLMN for access to RLOS and presents to the user the PLMNs offering access to RLOS in the following order: (i) PLMNs contained in the RLOS preferred PLMN list configured in the USIM or in the ME if the MCC part of the preferred PLMN is present in the RLOS allowed MCC list configured in the USIM or in the ME; and (ii) any of the remaining PLMNs offering access to RLOS that are not in the RLOS preferred PLMN list if the MCC part of the PLMN is present in the RLOS allowed MCC list configured in the USIM or in the ME. Upon selection of a PLMN by the user, the UE 302 proceeds with step 605.

In the FIG. 6 example, it is assumed that the automatic or manual PLMN selection process results in selecting PLMN 307-A, and the UE 302 in step 605 initiates RLOS attach to the RLOS qualified PLMN-A 307-A with the attach type indicating "EPS RLOS attach" in the attach request message. When the UE 302 initiates attaching to selected PLMN, the UE 302 uses IMEI as EPS mobile identity if the UE 302 has no valid GUTI, P-TMSI or IMSI. The step 605 attach request may also include: a KSI; a mobile identity including an IMEI, an IMSI, a GUTI or a P-TMSI; UE network capabilities, including security algorithms such as SA1={EEA, EIA}; the attach type of "EPS RLOS attach"; and a PDN connectivity request with request type of "RLOS".

In step 606, the RLOS attach to the MME 308 in PLMN-A 307-A is rejected. The attach reject message sets an EMM cause to "PLMN not allowed", "illegal MS", "illegal ME", "IMSI unknown in HSS", "EPS services not allowed", or "Requested service option not authorized in this PLMN", or another suitable EMM cause value. The UE 302 is in a limited service state in step 607, and in step 608 checks for conditions or triggering UE for access to RLOS and select a PLMN (e.g., a new or different PLMN than PLMN-A 307-A for which the attach was rejected in step 606) using processing similar to that described above with respect to step 604. Such processing includes presenting an RLOS initiation request to the user 303, and the user 303 confirming initiation of RLOS. PLMN selection is then initiated (e.g., either automatic or manual as described elsewhere herein). The PLMN selection is successful if a next RLOS qualified PLMN can be found. In the FIG. 6 example, the failed PLMN-A 307-A is skipped during the processing of step 608, and it is assumed that PLMN-B 307-B is selected. In step 609, the UE 302 initiates RLOS attach again using the newly selected RLOS qualified PLMN by sending an attach request to MME 308 in PLMN-B 307-B, where the attach request includes parameters similar to those described above with respect to step 605.

Failure handling related to TAU requests will now be described with respect to FIGS. 7 and 8. FIG. 7 shows the procedure and handling by the MME side when the MME 308 receives a TAU request from a UE 302 that has no security context, but which is already attached for access to RLOS and has a RLOS connection established. The process flow 700 of FIG. 7 begins in step 701, where the UE 302 may or may not have a USIM. The UE 302 receives broadcast system information with a list of PLMNs in step 702, indicating whether each of the PLMNs supports RLOS. The information is delivered to the EMM layer in the UE 302. The UE 302 forms a list of RLOS supported PLMNs in step 703. In the FIG. 7 example, the list of RLOS supported PLMNs is {PLMN-C, PLMN-A, PLMN-B}.

The UE 302 is already attached for access to RLOS and has a RLOS connection established in PLMN-A 307-A in step 704. The UE 302 initiates a TAU procedure, and sends a TAU request to MME 308 in step 705. The MME 308 in step 706 determines that no valid EPS security context is available. In step 707, the MME 308 creates a locally generated $K_{ASME}$ and native non-current EPS security context with EEA0 as the selected encryption algorithm and EIA0 as the selected integrity algorithm. The MME 308 then sends a security mode command message to the UE 302 in step 708. The MME 308 takes the newly created security context into usage by initiating the secure mode command procedure. The MME 308 resets the downlink NAS COUNT counter and use it to integrity protect the initial secure mode command message in step 708. The secure mode command message of step 708 includes a KSI value in the NAS key set identifier IE set to "000" and EIA0 and EEA0 as the selected NAS security algorithms. The UE 302 in step 709 creates a locally generated $K_{ASME}$ and an EPS security context based on the selected security algorithm {EEA0, EIA0}. The UE 302 then sends a secure mode command complete message to the MME 308 in step 710. The MME 308 in step 711 puts the new NAS security context into use. In step 712, the MME 308 sends a TAU accept message to the UE 302 to complete the TAU procedure. The UE 302 remains attached for access to RLOS and has a RLOS connection established in PLMN-A 307-A.

FIG. 8 shows the procedure and handling on the MME side when the MME 308 rejects a TAU request from a UE 302 that has no security context, but which is already attached for access to RLOS and has a RLOS connection established. The process flow 800 in FIG. 8 begins in step 801 with the UE 302 receiving broadcast system information with a list of PLMNs, indicating whether each of the PLMNs supports RLOS. The information is delivered to the EMM layer in the UE 302. The UE 302 forms a list of RLOS supported PLMNs in step 802. In the FIG. 8 example, the list of RLOS supported PLMNs is {PLMN-C, PLMN-A, PLMN-B}.

The UE 302 is already attached for access to RLOS and has a RLOS connection established in PLMN-A 307-A in step 803. Although PLMN-C 307-C also supports RLOS access, its MCC {311} is not in the allowed MCC list and is thus not selected. The UE 302 initiates a TAU procedure, and sends a TAU request to MME 308 in step 804. The MME 308 in step 805 sends a TAU reject message to the UE 302. The UE 302 in step 806 detaches locally, and enters a limited service state in step 807. In step 808, the UE 302 checks conditions for triggering UE for access to RLOS as specified above. If the conditions are satisfied (e.g., the IMSI of the UE 302, MCC=310, is in the allowed MCC list), the UE 302 initiates a PLMN selection process for RLOS access based on the list of RLOS supported PLMN lists. The UE 302 initiates a request to the user 303 for consent to initiate connection for access to RLOS.

If the user 303 provides consent for access to RLOS and the UE 302 is set to automatic PLMN selection, the UE 302 proceeds to determine RLOS qualified PLMN for access to RLOS as follows. If at least one preferred PLMN exists based on the RLOS preferred PLMN list configured in the USIM or in the NAS configuration MO in the ME and the MCC part of the preferred PLMN is present in the RLOS allowed MCC list configured in the USIM or NAS configuration MO, the UE 302 selects the preferred PLMN offering access to RLOS and indicates the selected preferred PLMN for access to RLOS. If none of the preferred PLMNs for access to RLOS are available, the UE 302 evaluates the remaining PLMNs offering access to RLOS that are not in the RLOS preferred PLMN list. If the MCC part of a PLMN is present in the RLOS allowed MCC list configured in the USIM or NAS configuration MO, the UE 302 selects this PLMN and indicates the selected PLMN for access to RLOS.

If the user 303 provides consent for access to RLOS and the UE 302 is set to perform manual PLMN selection, the UE 302 proceeds to determine RLOS qualified PLMN for access to RLOS and presents to the user 303 the PLMNs offering access to RLOS in the following order: (i) PLMNs contained in the RLOS preferred PLMN list configured in the USIM or in the ME if the MCC part of the preferred PLMN is present in the RLOS allowed MCC list configured in the USIM or in the ME; and (ii) any of the remaining PLMNs offering access to RLOS that are not in the RLOS preferred PLMN list if the MCC part of the PLMN is present in the RLOS allowed MCC list configured in the USIM or in the ME. Upon selection of a PLMN by the user 303, the UE 302 proceeds to step 809.

The PLMN selection (e.g., manual or automatic as described above) is successful if a RLOS qualified PLMN can be found. In the FIG. 8 example, the failed PLMN-A 307-A is skipped, and it is assumed that PLMN-B 307-B is selected (e.g., PLMN-A 307-B is in the RLOS preferred PLMN list and also the MCC of the PLMN-B 307-B is in the RLOS allowed MCC list {310}, so PLMN-B 307-B is the selected PLMN for the UE 302 to initiate access to RLOS). In step 809, the UE 302 sends an attach request to MME 308 in PLMN-B 307-B. The attach type in the step 809 attach request indicates "EPS RLOS attach" and includes parameters similar to that described above in conjunction with the attach request of step 609.

Failure handling related to service requests will now be described with respect to FIGS. 9 and 10. FIG. 9 illustrates the procedure and handling on the MME side when the MME 308 receives a service request from a UE 302 that has no security context, but which is already attached for access to RLOS and has a RLOS connection established. The process flow 900 of FIG. 9 begins in step 901, where the UE 302 may or may not have a USIM. The UE 302 receives broadcast system information with a list of PLMNs in step 902, indicating whether each of the PLMNs supports RLOS. The information is delivered to the EMM layer in the UE 302. The UE 302 forms a list of RLOS supported PLMNs in step 903. In the FIG. 9 example, the list of RLOS supported PLMNs is {PLMN-C, PLMN-A, PLMN-B}.

The UE 302 is already attached for access to RLOS and has a RLOS connection established in PLMN-A 307-A in step 904. The UE 302 initiates a service request procedure, and sends a service request to MME 308 in step 905. The MME 308 in step 906 determines that no valid EPS security context is available. In step 907, the MME 308 creates a locally generated $K_{ASME}$ and native non-current EPS security context with EEA0 as the selected encryption algorithm and EIA0 as the selected integrity algorithm. The MME 308 then sends a security mode command message to the UE 302 in step 908. The MME 308 takes the newly created security context into usage by initiating the secure mode command procedure. The MME 308 resets the downlink NAS COUNT counter and uses it to integrity protect the initial secure mode command message in step 908. The secure mode command message of step 908 includes a KSI value in the NAS key set identifier IE set to "000" and EIA0 and EEA0 as the selected NAS security algorithms. The UE 302 in step 909 creates a locally generated $K_{ASME}$ and an EPS security context based on the selected security algorithm {EEA0, EIA0}. The UE 302 then sends a secure mode command complete message to the MME 308 in step 910. The MME 308 in step 911 puts the new NAS security context into use. In step 912, the MME 308 sends a service accept message to the UE 302 to complete the service request procedure. The UE 302 remains attached for access to RLOS and has a RLOS connection established in PLMN-A 307-A.

FIG. 10 illustrates the procedure and handling on the MME side when the MME 308 rejects a service request from a UE 302 that has no security context, but which is already attached for access to RLOS and has a RLOS connection established. The process flow 1000 in FIG. 10 begins in step 1001 with the UE 302 receiving broadcast system information with a list of PLMNs, indicating whether each of the PLMNs supports RLOS. The information is delivered to the EMM layer in the UE 302. The UE 302 forms a list of RLOS supported PLMNs in step 1002. In the FIG. 10 example, the list of RLOS supported PLMNs is {PLMN-C, PLMN-A, PLMN-B}.

The UE 302 is already attached for access to RLOS and has a RLOS connection established in PLMN-A 307-A in step 1003. Although PLMN-C 307-C also supports RLOS access, its MCC {311} is not in the RLOS allowed MCC list and thus is not selected. The UE 302 initiates a service request procedure, and sends a service request to the MME 308 in step 1004. The MME 308 in step 1005 sends a service reject message to the UE 302. The UE 302 in step 1006 detaches locally, and enters a limited service state in step 1007. In step 1008, the UE 302 checks conditions for triggering UE for access to RLOS as specified above. If the conditions are satisfied (e.g., the IMSI of the UE 302, MCC=310, is in the allowed MCC list), the UE 302 initiates a PLMN selection process for RLOS access based on the list of RLOS supported PLMN lists. The UE 302 initiates a request to the user 303 for consent to initiate connection for access to RLOS.

If the user 303 provides consent for access to RLOS and the UE 302 is set to automatic PLMN selection, the UE 302 proceeds to determine RLOS qualified PLMN for access to RLOS as follows. If at least one preferred PLMN exists based on the RLOS preferred PLMN list configured in the USIM or in the NAS configuration MO in the ME and the MCC part of the preferred PLMN is present in the RLOS allowed MCC list configured in the USIM or NAS configuration MO, the UE 302 selects the preferred PLMN offering access to RLOS and indicates the selected preferred PLMN for access to RLOS. If none of the preferred PLMNs for access to RLOS are available, the UE 302 evaluates the remaining PLMNs offering access to RLOS that are not in the RLOS preferred PLMN list. If the MCC part of a PLMN is present in the RLOS allowed MCC list configured in the USIM or NAS configuration MO, the UE 302 selects this PLMN and indicate the selected PLMN for access to RLOS.

If the user 303 provides consent for access to RLOS and the UE 302 is set to perform manual PLMN selection, the UE 302 proceeds to determine RLOS qualified PLMN for access to RLOS and presents to the user 303 the PLMNs offering access to RLOS in the following order: (i) PLMNs contained in the RLOS preferred PLMN list configured in the USIM or in the ME if the MCC part of the preferred PLMN is present in the RLOS allowed MCC list configured in the USIM or in the ME; and (ii) any of the remaining PLMNs offering access to RLOS that are not in the RLOS preferred PLMN list if the MCC part of the PLMN is present in the RLOS allowed MCC list configured in the USIM or in the ME. Upon selection of a PLMN by the user 303, the UE 302 proceeds to step 1009.

The PLMN selection (e.g., manual or automatic as described above) is successful if a RLOS qualified PLMN can be found. In the FIG. 10 example, the failed PLMN-A 307-A is skipped, and it is assumed that PLMN-B 307-B is selected (e.g., PLMN-A 307-B is in the RLOS preferred PLMN list and also the MCC of the PLMN-B 307-B is in the RLOS allowed MCC list {310}, so PLMN-B 307-B is the selected PLMN for the UE 302 to initiate access to RLOS). In step 1009, the UE 302 sends an attach request to MME 308 in PLMN-B 307-B. The attach type in the step 1009 attach request indicates "EPS RLOS attach" and includes parameters similar to that described above in conjunction with the attach request of step 609.

RLOS may be a regulatory feature, and thus techniques are needed for handling RLOS and associated failure cases for a 5G system. FIG. 11, as noted above, illustrates how UE 1102 can indicate RLOS registration type 1101 during a registration procedure when accessing the 5G network. The system 1100 of FIG. 11 includes the UE 1102, a 3GPP access network 1104, an NG Radio Access Network (NG-RAN) 1106, an AMF 1108, elements 1110 that provide the functionality of a 4G HSS in the 5G network including an AUSF 1112, User Data Management (UDM) 1114 and User Data Repository (UDR) 1116, a SMF 1118, a PCF 1120, a UPF 1122 and a DN 1124. FIG. 11 also illustrates the reference points representing interactions between such elements (e.g., the N12 reference point between the AMF 1108 and AUSF 1112, the N13 reference point between the AUSF 1112 and the UDM 1114, etc.). The UE 1102 provides an indication of RLOS registration type 1101 to the AMF 1108 via the 3GPP access network 1104 and NG-RAN 1106 as illustrated.

This can be supported by introducing a new registration type {RLOS registration}. The 5GS registration type IE is used to indicate the type of requested registration. FIG. 12 illustrates the 5GS registration type IE 1201 and the 5GS registration type value 1203, including the new registration type "RLOS registration" with bits set to "1 0 1" as shown.

Similar to RLOS attach to 4G EPC network, when the UE 1102 initiates registration to a 5G network for RLOS access, situations could occur resulting in the UE 1102 having no security context, for example, when the UE 1102 does not have UICC, it has no IMSI and is not able to perform required authentication procedures. It could also happen that the UE 1102 indicated 5GS encryption algorithms or 5GS integrity algorithms are not acceptable by the network due to various reasons (e.g., mandatory 5GS encryption algorithms not supported, mandatory 5GS integrity algorithms not supported).

FIG. 13 illustrates the procedure and handling on the AMF side when the UE 1102 initiates a registration procedure for RLOS attach to the 5G network, and the AMF 1108 in the service network has no security context. It is assumed, in the FIG. 13 example, that the UE 1102 has no UICC/USIM in step 1301. In step 1302, the UE 1102 receives a broadcast system information with a list of PLMNs (e.g., PLMNs A, B, C, . . . Z), indicating whether each of the PLMNs support RLOS. This information is delivered to the 5GS Mobility Management (5GMM) layer in the UE 1102. The UE 1102 forms a list of RLOS supported PLMNs in step 1303. In the FIG. 13 example, the list of RLOS supported PLMNs is {PLMN-C, PLMN-A, PLMN-B}.

In step 1304, the UE 1102 is in limited service state. The UE 1102 checks conditions for triggering UE access to RLOS in step 1305 and, if conditions are satisfied and confirmed by the user, the UE 1102 initiates an RLOS registration to a selected PLMN (e.g., to PLMN-A 1107-A in the FIG. 13 example) in step 1305. The UE 1102 may initiate automatic or manual PLMN selection. The UE 1102 initiates a request to the user (e.g., of the UE 1102) for consent to initiate connection for access to RLOS. If the user provides consent for access to RLOS and the UE 1102 is set to automatic PLMN selection, the UE 1102 proceeds to determine RLOS qualified PLMN for access to RLOS as follows. If at least one preferred PLMN exists based on the RLOS preferred PLMN list configured in the USIM or in the NAS configuration MO in the ME and the MCC part of the preferred PLMN is present in the RLOS allowed MCC list configured in the USIM or NAS configuration MO, the UE 1102 selects the preferred PLMN offering access to RLOS and indicates the selected preferred PLMN for access to RLOS. If none of the preferred PLMNs for access to RLOS are available, the UE 1102 evaluates the remaining PLMNs offering access to RLOS that are not in the RLOS preferred PLMN list. If the MCC part of a PLMN is present in the RLOS allowed MCC list configured in the USIM or NAS configuration MO, the UE 102 selects this PLMN and indicates the selected PLMN for access to RLOS. In the FIG. 13 example, PLMN-A 1107-A is in the RLOS preferred PLMN list and also the MCC of PLMN-A 1107-A is in the RLOS allowed MCC list {310}, so PLMN-A 1107-A is the selected PLMN for the UE 1102 to initiate access to RLOS.

If the user provides consent for access to RLOS and the UE 1102 is set to perform manual PLMN selection, the UE 1102 proceeds to determine RLOS qualified PLMN for access to RLOS and presents to the user the PLMNs offering access to RLOS in the following order: (i) PLMNs contained in the RLOS preferred PLMN list configured in the USIM or in the ME if the MCC part of the preferred PLMN is present in the RLOS allowed MCC list configured in the USIM or in the ME; and (ii) any of the remaining PLMNs offering access to RLOS that are not in the RLOS preferred PLMN list if the MCC part of the PLMN is present in the RLOS allowed MCC list configured in the USIM or in the ME. Upon selection of a PLMN by the user, the UE 1102 proceeds with initiating access to RLOS.

In the FIG. 13 example, it is assumed that the automatic or manual PLMN selection process results in selecting PLMN 1107-A, and the UE 1102 in step 1306 requests access to RLOS by initiating a registration request to the AMF 1108 of the selected PLMN (e.g., PLMN-A 1107-A) with the registration type indicating "RLOS registration" in the registration request message. The registration request message may include various parameters, including: a 5G KSI (ngKSI); a mobile identity such as an IMEI, IMSI, 5G-GUTI, or 5G-TMSI; UE network capability including security algorithms (SA1=NEA, NIA); the registration type "RLOS registration"; etc.

If the AMF 1108 is configured to support RLOS an decides to accept the RLOS request, the AMF 1108 accepts the registration request regardless of the authentication result, or the AMF 1108 may skip the authentication procedure. In step 1307, the AMF 1108 determines that there is no UE context or UE security context for the UE 1102. If no valid 5GS security context is available, the AMF 1108 in step 1308-1 creates a locally generated $K_{AMF}$ and native non-current 5GS security context with NEA0 as the selected encryption algorithm and NIA0 as the selected integrity algorithm. The AMF 1108 takes the newly-created security context in step 1308 into use by initiating a secure mode command procedure in step 1308-2. The AMF 1108 resets the downlink NAS COUNT counter, and uses it to integrity protect the initial secure mode command message sent to the UE 1102 in step 1309. The step 1309 secure mode command message includes a ngKSI value in the key set identifier IE set to "000" and uses NIA0 and NEA0 as the selected NAS security algorithms.

The UE 1102 in step 1310 creates a locally generated $K_{AMF}$ and a 5GS security context based on the selected security algorithm {NEA0, NIA0}. The UE 1102 then sends a secure mode command complete message to the AMF 1108 in step 1311. The new NAS security context is put into use by the AMF 1108 in step 1312. If a PDU session establishment request is included in the step 1306 registration request for establishing a PDU session for RLOS, the AMF 1108 in step 1313 forwards the PDU session establishment request to SMF 1118. After successful PDU session establishment, the AMF 1108 sends a registration accept message to the UE 1102 in step 1314. The UE 1102 responds to the AMF 1108 with a registration complete message in step 1315. After successful completion of the registration procedure, the UE 1102 is registered for access to RLOS and the PDU session for RLOS is established in step 1316.

Various conditions may trigger UE access to RLOS if the UE 1102 has a UICC/USIM, such as the UE 1102 being in a limited service state and UE registration cannot be achieved on any PLMN, the UE 1102 supporting access to RLOS, one or more PLMNs offering access to RLOS have been found, and one of the following is true: a RLOS allowed MCC list is not configured on either USIM or NAS configuration MO; a RLOS allowed MCC list is configured on either USIM or NAS configuration MO, but the list is empty; a RLOS allowed MCC list is configured in either USIM or NAS configuration MO, the list is not empty, and the MCC part of the IMSI in the USIM is present in the RLOS allowed MCC list configured in the USIM; or a RLOS allowed MCC list is configured in both USIM and NAS configuration MO, the RLOS allowed MCC list configured in USIM is not empty, and the MCC part of the IMSI is present in the RLOS allowed MCC list configured in the USIM. If the RLOS allowed MCC list is configured in both USIM and NAS configuration MO, the list configured in the USIM takes priority over the list configured in the NAS configuration MO on the ME.

Various conditions may also trigger UE access to RLOS if the UE 1102 does not have UICC/USIM (e.g., a UICC-less UE), such as if the UE 1102 is in limited service state and UE registration cannot be achieved on any PLMN, the UE 1102 supports access to RLOS, and the list of RLOS supported PLMNs is not empty (e.g., one or more PLMNs offering access to RLOS have been found). If the conditions are satisfied, the UE 1102 initiates a PLMN selection procedure to find a RLOS qualified PLMN for UE access to RLOS.

FIG. 14 illustrates the procedure and handling on the AMF side when the UE 1102 initiates RLOS attach to the 5G network and the AMF 1108 receives authentication failure from the UE 1102. The process flow 1400 of FIG. 14 assumes that the UE 1102 is either in automatic or manual PLMN selection mode. It is further assumed that the UE 1102 supporting RLOS access has been configured with an RLOS allowed MCC list and RLOS preferred PLMNs, either in a USIM EF file or NAS configuration MO. In step 1401, the UE 1102 receives broadcast system information including a list of PLMNs, indicating whether each of the PLMNs supports RLOS. The information is delivered to the 5G Mobility Management (5GMM) layer in the UE 1102. The UE 1102 forms a list of RLOS supported PLMNs in step 1402. In the FIG. 14 example, the list of RLOS supported PLMNs is {PLMN-C, PLMN-A, PLMN-B}.

The UE 1102 is assumed to have an UICC card containing USIM and is in a limited service state in step 1403. In step 1404, the UE 1102 checks for conditions triggering UE access to RLOS as specified above. If the conditions are satisfied (e.g., the IMSI of the UE 1102 has MCC=310 which is in the allowed MCC list) the UE initiates a PLMN selection process for RLOS access based on the RLOS supported PLMN list formed in step 1402.

The UE 1102 initiate a request to a user for consent to initiate connection for access to RLOS. If the user provides consent for access to RLOS, the UE 1102 proceeds to determine RLOS qualified PLMN for access to RLOS as follows. If at least one preferred PLMN exists based on the RLOS preferred PLMN list configured in the USIM or in the NAS configuration MO in the ME and the MCC part of the preferred PLMN is present in the RLOS allowed MCC list configured in the USIM or NAS configuration MO, the UE 1102 selects the preferred PLMN offering access to RLOS and indicates the selected preferred PLMN for access to RLOS. If none of the preferred PLMNs for access to RLOS is available, the UE 1102 evaluates the remaining PLMNs offering access to RLOS that are not in the RLOS preferred PLMN list. If the MCC part of a PLMN is present in the RLOS allowed MCC list configured in the USIM or NAS configuration MO, the UE 1102 selects this PLMN and indicates the selected PLMN for access to RLOS. In the FIG. 14 example, the PLMN-A 1107-A is in the RLOS preferred PLMN list, and the MCC of PLMN-A 1107-A is in the RLOS allowed MCC list {310}, so PLMN-A 1107-A is the selected PLMN for the UE 1102 to initiate access for RLOS.

The UE 1102 initiates RLOS registration to the RLOS qualified PLMN-A 1107-A, with the registration type indicating "RLOS registration" in the registration request message sent in step 1405. When UE 1102 initiates registration to the selected PLMN 1107-A, the UE 1102 uses IMEI as the 5GS mobile identity if the UE 1102 has no valid 5G-GUTI, or 5G-TMSI. The registration request message of step may include various parameters, including: an ngKSI; a mobile identity such as an IMEI, IMSI, 5G-GUTI, or 5G-TMSI; UE network capability including security algorithms (SA1=an NEA algorithm NEA_R, an NIA algorithm $NIA_x$); the registration type "RLOS registration"; etc.

The AMF 1108 in step 1406 initiates an authentication procedure with the UE 1102. The UE 1102 in step 1407 indicates authentication failure to the AMF 1108. If the AMF 1108 is configured to support RLOS and decides to accept the RLOS request, the AMF 1108 in step 1408-1 accepts the registration request from the UE 1102 regardless of the authentication result. If no valid 5GS security context is available, the AMF 1108 creates a locally generated $K_{AMF}$ and native non-current 5GS security context with NEA0 as the selected encryption algorithm and NIA0 as the selected integrity algorithm. The AMF 1108 takes the newly created security context into use by initiating a secure mode command procedure in step 1408-2. The AMF 1108 resets the downlink NAS COUNT counter and uses it to integrity protect the initial secure mode command message sent to the UE 1102 in step 1409. The step 1409 secure mode command message includes an ngKSI value in the NAS key set identifier IE set to "000" and NIA0 and NEA0 as the selected NAS security algorithms. The UE 1102 in step 1410 creates a locally generated $K_{AMF}$ and a 5GS security context based on the selected security algorithm {NEA0, NIA0}.

In step 1411, the UE 1102 sends a secure mode command complete message to AMF 1108. The new NAS security context is put into use by the AMF 1108 in step 1412. If a PDU session establishment request is included in the step 1405 registration request for establishing a PDU session for RLOS, the AMF 1108 in step 1413 forwards the PDU session establishment request to SMF 1118. The AMF 1108 then sends a registration accept message to the UE 1102 in step 1414. The UE 1102 responds to the AMF 1108 with a registration complete message in step 1415. After successful completion of the registration procedure, the UE 1102 is registered for access to RLOS and the PDU session for RLOS is established in step 1416.

FIG. 15 illustrates the procedure and handling on the AMF side when the UE 1102 initiates registration for RLOS attach to the 5G network and the AMF 1108 rejects the registration request from the UE 1102. Conditions for triggers the UE access to RLOS are determined as described above. If the conditions are satisfied, the UE 1102 initiates a PLMN selection procedure to find a RLOS qualified PLMN for UE access to RLOS. Similar to the process flow 1400 of FIG. 14 described above, the UE 1102 may be set in either automatic or manual PLMN selection mode. It is further assumed that the UE 1102 supports RLOS access and has been configured with a RLOS allowed MCC list and a RLOS preferred PLMN list, either in a USIM EF file or NAS configuration MO.

In step 1501, the UE 1102 receives broadcast system information with a list of PLMNs, indicating whether each of the PLMNs supports RLOS. The information is delivered to the 5GMM layer in the UE 1102. The UE 1102 forms a list of RLOS supported PLMNs in step 1502. In the FIG. 15 example, the list of RLOS supported PLMNs is {PLMN-C, PLMN-A, PLMN-B}. The UE 1102 is in a limited service state in step 1503, and in step 1504 checks conditions for triggering the UE 1102 for access to RLOS.

The conditions for triggering UE 1102 for access to RLOS are as follows. If the UE 1102 has a UICC/USIM, the conditions include determining that the UE 1102 is in limited service state and UE registration cannot be achieved on any PLMN, the UE 1102 supports access to RLOS, one or more PLMNs offering access to RLOS has been found, and one of the following is true: the RLOS allowed MCC list is not configured on either USIM or NAS configuration MO; the RLOS allowed MCC list is configured on either USIM or NAS configuration MO, but the list is empty; the RLOS allowed MCC list is configured in either USIM or NAS configuration MO, the list is not empty, and the MCC part of the IMSI in the USIM is present in the RLOS allowed MCC list configured in the USIM; or the RLOS allowed MCC list is configured in both USIM and NAS configuration MO, the RLOS allowed MCC list configured in USIM is not empty, and the MCC part of the IMSI is present in the RLOS allowed MCC list configured in the USIM. If the RLOS allowed MCC list is configured in both USIM and NAS configuration MO, the list configured in configured in USIM takes priority over the list configured in configured in NAS configuration MO on the ME. If the UE 1102 does not have UICC/USIM (e.g., UICC-less UE), the conditions include determining that the UE 1102 is in limited service state and UE registration cannot be achieved on any PLMN, the UE 1102 supports access to RLOS, and the list of RLOS supported PLMNs is not empty (e.g., one or more PLMNs offering access to RLOS has been found). If the conditions are satisfied, the UE 1102 initiates PLMN selection procedure to find a RLOS qualified PLMN for UE access to RLOS.

It is assumed in FIG. 15 that the conditions are satisfied (e.g., including that the IMSI of the UE 1102 has a MCC=310 which is in the list of allowed MCC list), the UE 1102 initiates a PLMN selection process for RLOS access based on the list of RLOS supported PLMN list received in step 1501 (e.g., as part of broadcast system information from the roaming networks).

The UE 1102 initiates a request to the user 1103 for consent to initiate connection for access to RLOS. If the user 1103 provides consent for access to RLOS and the UE 1102 is set to automatic PLMN selection, the UE 1102 proceeds to determine RLOS qualified PLMN for access to RLOS as follows. If at least one preferred PLMN exists based on the RLOS preferred PLMN list configured in the USIM or in the NAS configuration MO in the ME and the MCC part of the preferred PLMN is present in the RLOS allowed MCC list configured in the USIM or NAS configuration MO, the UE 1102 selects the preferred PLMN offering access to RLOS and indicates the selected preferred PLMN for access to RLOS. If none of the preferred PLMNs for access to RLOS is available, the UE 1102 evaluates the remaining PLMNs offering access to RLOS that are not in the RLOS preferred PLMN list. If the MCC part of a PLMN is present in the RLOS allowed MCC list configured in the USIM or NAS configuration MO, the UE 1102 selects this PLMN and indicates the selected PLMN for access to RLOS. In the FIG. 11 example, the PLMN-A 1107-A is in the RLOS preferred PLMN list, and the MCC of PLMN-A 1107-A is in the RLOS allowed MCC list {310}, so PLMN-A 1107-A is the selected PLMN for the UE 1102 to initiate access to RLOS. Although PLMN-C also supports RLOS access, its MCC {311} is not in the RLOW allowed MCC list and thus is not selected.

If the user 1103 provides consent for access to RLOS and the UE 1102 is set to perform manual PLMN selection, the UE 1102 proceeds to determine RLOS qualified PLMN for access to RLOS and presents to the user the PLMNs offering access to RLOS in the following order: (i) PLMNs contained in the RLOS preferred PLMN list configured in the USIM or in the ME if the MCC part of the preferred PLMN is present in the RLOS allowed MCC list configured in the USIM or in the ME; and (ii) any of the remaining PLMNs offering access to RLOS that are not in the RLOS preferred PLMN list if the MCC part of the PLMN is present in the RLOS allowed MCC list configured in the USIM or in the ME. Upon selection of a PLMN by the user, the UE 1102 proceeds with step 1505.

In the FIG. 15 example, it is assumed that the automatic or manual PLMN selection process results in selecting PLMN 1107-A, and the UE 1102 in step 1505 initiates an initial registration request for RLOS access to the RLOS qualified PLMN-A 1107-A with the registration type indicating "RLOS registration" in the registration request message. When the UE 1102 initiates registration to the selected PLMN, the UE 1102 uses IMEI as the 5GS mobile identity if the UE 1102 has no valid 5G-GUTI or SUCI. The step 1505 registration request may also include: an ngKSI; a mobile identity such as an IMEI, IMSI, 5G-GUTI, or 5G-TMSI; UE network capability including security algorithms (SA1=NEA, NIA); the registration type "RLOS registration"; etc.

In step 1506, the RLOS registration to the AMF 1108 in PLMN-A 1107-A is rejected. The registration reject message sets a 5GMM cause to "PLMN not allowed", "illegal MS", "illegal ME", "5GS services not allowed", or "Requested service option not subscribed", or another suitable 5GMM cause value. The UE 1102 is in a limited service state in step 1507, and in step 1508 checks for conditions or triggering UE for access to RLOS and selects a next qualified PLMN (e.g., a new or different PLMN than PLMN-A 1107-A for which the attach was rejected in step 1506) using processing similar to that described above with respect to step 1504. Such processing includes presenting an RLOS initiation request to the user 1103, and the user 1103 confirming initiation of RLOS. The PLMN selection (e.g., manual or automatic as described above) is successful if a RLOS qualified PLMN can be found. In the FIG. 15 example, the failed PLMN-A 1107-A is skipped, and it is assumed that PLMN-B 1107-B is selected. In step 1509, the UE 1102 initiates registration for RLOS attach again using the newly selected RLOS qualified PLMN by sending a registration request to AMF 1108 in PLMN-B 1107-B, where the registration request includes parameters similar to those described above with respect to step 1505.

Failure handling related to UE registration requests for a UE with a RLOS PDU session will now be described with respect to FIGS. 16 and 17. FIG. 16 shows the procedure and handling on the AMF side when the AMF 1108 receives a registration update request from a UE 102 that has no security context, but which is already registered for access to RLOS and has a RLOS PDU session established (e.g., in PLMN-A 1107-A).

The process flow 1600 of FIG. 16 begins with the UE 1102 receiving broadcast system information with a list of PLMNs in step 1601, indicating whether each of the PLMNs supports RLOS. The information is delivered to the 5GMM layer in the UE 1102. The UE 1102 forms a list of RLOS supported PLMNs in step 1602. In the FIG. 16 example, the list of RLOS supported PLMNs is {PLMN-C, PLMN-A, PLMN-B}.

The UE 1102 is already attached for access to RLOS and has a RLOS connection established in PLMN-A 1107-A in step 1603. The UE 1102 initiates a registration update procedure with registration type set to "mobility registration update" or "periodic registration update," and sends a registration update request to AMF 1108 in step 1604. The AMF 1108 in step 1605 determines that no valid 5GS security context is available, and the AMF 1108 in step 1606-1 creates a locally generated $K_{AMF}$ and native non-current 5GS security context with NEA0 as the selected encryption algorithm and NIA0 as the selected integrity algorithm. The AMF 1108 takes the newly created security context into usage by initiating the secure mode command procedure in step 1606-2. The AMF 1108 resets the downlink NAS COUNT counter and uses it to integrity protect an initial secure mode command message sent from the AMF 1108 to the UE 1102 in step 1607. The secure mode command message of step 1607 includes a ngKSI value in the NAS key set identifier IE set to "000" and NIA0 and NEA0 as the selected NAS security algorithms. The UE 1102 in step 1608 creates a locally generated $K_{AMF}$ and a 5GS security context based on the selected security algorithm {NEA0, NIA0}. The UE 1102 then sends a secure mode command complete message to the AMF 1108 in step 1609. The AMF 1108 in step 1610 puts the new NAS security context into use. In step 1611, the AMF 1108 sends a registration update accept message to the UE 1102 to complete the registration update procedure. The UE 1102 remains attached for access to RLOS and has a RLOS connection established in PLMN-A 1107-A.

FIG. 17 illustrates the procedure and handling on the AMF side when the AMF 1108 rejects a registration update request from a UE 1102 (e.g., the AMF 1108 does not accept the registration update request from the UE 1102) that is already registered for access to RLOS and has a RLOS connection established. The process flow 1700 in FIG. 17 begins in step 1701 with the UE 1102 receiving broadcast system information with a list of PLMNs from the roaming networks, indicating whether each of the PLMNs supports RLOS. The information is delivered to the 5GMM layer in the UE 1102. The UE 1102 forms a list of RLOS supported PLMNs in step 1702. In the FIG. 17 example, the list of RLOS supported PLMNs is {PLMN-C, PLMN-A, PLMN-B}.

The UE 1102 is already attached for access to RLOS and has a RLOS connection established in PLMN-A 1107-A in step 1703. While PLMN-C 1107-C also supports RLOS access, its MCC {311} is not in the RLOS allowed MCC list and thus is not selected. The UE 1102 initiates a registration update procedure, and sends a registration update request with a registration type of "mobility registration updating" or "periodic registration updating" to the AMF 1108 in step 1704. The AMF 1108 in step 1705 sends a registration update reject message to the UE 1102. The UE 1102 in step 1706 detaches locally, and enters a limited service state in step 1707. In step 1708, the UE 1102 checks conditions for triggering UE for access to RLOS as specified above. If the conditions are satisfied (e.g., the IMSI of the UE 1102, MCC=310, is in the allowed MCC list), the UE 1102 initiates a PLMN selection process for RLOS access based on the list of RLOS supported PLMN lists. The UE 1102 initiates a request to the user 1103 for consent to initiate connection for access to RLOS.

If the user 1103 provides consent for access to RLOS and the UE 1102 is set to automatic PLMN selection, the UE 1102 proceeds to determine RLOS qualified PLMN for access to RLOS as follows. If at least one preferred PLMN exists based on the RLOS preferred PLMN list configured in the USIM or in the NAS configuration MO in the ME and the MCC part of the preferred PLMN is present in the RLOS allowed MCC list configured in the USIM or NAS configuration MO, the UE 1102 selects the preferred PLMN offering access to RLOS and indicates the selected preferred PLMN for access to RLOS. If none of the preferred PLMNs for access to RLOS are available, the UE 1102 evaluates the remaining PLMNs offering access to RLOS that are not in the RLOS preferred PLMN list. If the MCC part of a PLMN is present in the RLOS allowed MCC list configured in the USIM or NAS configuration MO, the UE 1102 selects this PLMN and indicates the selected PLMN for access to RLOS.

If the user 1103 provides consent for access to RLOS and the UE 1102 is set to perform manual PLMN selection, the UE 1102 proceeds to determine RLOS qualified PLMN for access to RLOS and presents to the user 1103 the PLMNs offering access to RLOS in the following order: (i) PLMNs contained in the RLOS preferred PLMN list configured in the USIM or in the ME if the MCC part of the preferred PLMN is present in the RLOS allowed MCC list configured in the USIM or in the ME; and (ii) any of the remaining PLMNs offering access to RLOS that are not in the RLOS preferred PLMN list if the MCC part of the PLMN is present in the RLOS allowed MCC list configured in the USIM or in the ME. Upon selection of a PLMN by the user 1103, the UE 1102 proceeds to step 1709. The PLMN selection (e.g., manual or automatic as described above) is successful if a RLOS qualified PLMN can be found. In the FIG. 17 example, the failed PLMN-A 1107-A is skipped, and it is assumed that PLMN-B 1107-B is selected (e.g., PLMN-A 1107-B is in the RLOS preferred PLMN list and also the MCC of the PLMN-B 1107-B is in the RLOS allowed MCC list {310}, so PLMN-B 1107-B is the selected PLMN for the UE 1102 to initiate access to RLOS). In step 1709, the UE 1102 sends a registration request to the AMF 1108 in PLMN-B 1107-B. The registration type in the step 1709 registration request indicates "RLOS registration" and includes parameters similar to that described above in conjunction with the registration request of step 1509. The UE 1102 uses IMEI as the 5GS mobile identity if the UE 1102 has no valid 5G-GUTI or SUCI.

Failure handling related to service requests will now be described with respect to FIGS. 18 and 19. FIG. 18 illustrates the procedure and handling on the AMF side when the AMF 1108 receives a service request from a UE 1102 that has no security context, but which is already registered for access to RLOS and has a RLOS connection established (e.g., in PLMN-A 1107-A). The process flow 1800 of FIG. 18 begins in step 1801, with the UE 1102 receiving broadcast system information with a list of PLMNs, indicating whether each of the PLMNs supports RLOS. The information is delivered to the 5GMM layer in the UE 1102. The UE 1102 forms a list of RLOS supported PLMNs in step 1802. In the FIG. 18 example, the list of RLOS supported PLMNs is {PLMN-C, PLMN-A, PLMN-B}.

The UE 1102 is already attached for access to RLOS and has a RLOS connection established in PLMN-A 1107-A in step 1803. The UE 1102 initiates a service request procedure, and sends a service request to AMF 1108 in step 1804. The AMF 1108 in step 1805 determines that no valid 5GS security context is available. In step 1806-1, the AMF 1108 creates a locally generated $K_{ASME}$ and native non-current 5GS security context with NEA0 as the selected encryption algorithm and NIA0 as the selected integrity algorithm. The AMF 1108 takes the newly created security context into usage by initiating the secure mode command procedure in step 1806-2. The AMF 1108 resets the downlink NAS COUNT counter and uses it to integrity protect an initial secure mode command message sent from the AMF 1108 to the UE 1102 in step 1807. The secure mode command message of step 1807 includes an ngKSI value in the NAS key set identifier IE set to "000" and NIA0 and NEA0 as the selected NAS security algorithms. The UE 1102 in step 1808 creates a locally generated $K_{ASME}$ and a 5GS security context based on the selected security algorithm {NEA0, NIA0}. The UE 1102 then sends a secure mode command complete message to the AMF 1108 in step 1809. The AMF 1108 in step 1810 puts the new NAS security context into use. In step 1811, the AMF 1108 sends a service accept message to the UE 1102 to complete the service request procedure. The UE 1102 remains registered for access to RLOS and has a RLOS connection established in PLMN-A 1107-A.

FIG. 19 illustrates the procedure and handling on the AMF side when the AMF 1108 rejects a service request from a UE 1102 that is already registered for access to RLOS and has a RLOS PDU connection established (e.g., in PLMN-A 1107-A). The process flow 1900 in FIG. 19 begins in step 1901 with the UE 1102 receiving broadcast system information from the roaming networks, indicating whether each of the PLMNs supports RLOS. The information is delivered to the 5GMM layer in the UE 1102. The UE 1102 forms a list of RLOS supported PLMNs in step 1902. In the FIG. 19 example, the list of RLOS supported PLMNs is {PLMN-C, PLMN-A, PLMN-B}.

The UE 1102 is already registered for access to RLOS and has a RLOS PDU connection established in PLMN-A 1107-A in step 1903. While the PLMN-C 1107-C also supports RLOS access, its MCC {311} is not in the RLOS allowed MCC list and thus is not selected. The UE 1102 initiates a service request procedure, and sends a service request to the AMF 1108 in step 1904. The AMF 1108 in step 1905 sends a service reject message to the UE 1102. The UE 1102 in step 1906 detaches locally, and enters a limited service state in step 1907. In step 1908, the UE 1102 checks conditions for triggering UE for access to RLOS as specified above. If the conditions are satisfied (e.g., the IMSI of the UE 1102, MCC=310, is in the allowed MCC list), the UE 1102 initiates a PLMN selection process for RLOS access based on the RLOS supported PLMN list. The UE 1102 initiates a request to the user 1103 for consent to initiate connection for access to RLOS.

If the user 1103 provides consent for access to RLOS and the UE 1102 is set to automatic PLMN selection, the UE 1102 proceeds to determine RLOS qualified PLMN for access to RLOS as follows. If at least one preferred PLMN exists based on the RLOS preferred PLMN list configured in the USIM or in the NAS configuration MO in the ME and the MCC part of the preferred PLMN is present in the RLOS allowed MCC list configured in the USIM or NAS configuration MO, the UE 1102 selects the preferred PLMN offering access to RLOS and indicates the selected preferred PLMN for access to RLOS. If none of the preferred PLMNs for access to RLOS are available, the UE 1102 evaluates the remaining PLMNs offering access to RLOS that are not in the RLOS preferred PLMN list. If the MCC part of a PLMN is present in the RLOS allowed MCC list configured in the USIM or NAS configuration MO, the UE 1102 selects this PLMN and indicate the selected PLMN for access to RLOS.

If the user 1103 provides consent for access to RLOS and the UE 1102 is set to perform manual PLMN selection, the UE 1102 proceeds to determine RLOS qualified PLMN for access to RLOS and presents to the user 1103 the PLMNs offering access to RLOS in the following order: (i) PLMNs contained in the RLOS preferred PLMN list configured in the USIM or in the ME if the MCC part of the preferred PLMN is present in the RLOS allowed MCC list configured in the USIM or in the ME; and (ii) any of the remaining PLMNs offering access to RLOS that are not in the RLOS preferred PLMN list if the MCC part of the PLMN is present in the RLOS allowed MCC list configured in the USIM or in the ME. Upon selection of a PLMN by the user 1103, the UE 1102 proceeds to step 1909.

The PLMN selection (e.g., manual or automatic as described above) is successful if a RLOS qualified PLMN can be found. In the FIG. 19 example, the failed PLMN-A 1107-A is skipped, and it is assumed that PLMN-B 1107-B is selected (e.g., PLMN-A 1107-B is in the RLOS preferred PLMN list and also the MCC of the PLMN-B 1107-B is in the RLOS allowed MCC list {310}, so PLMN-B 1107-B is the selected PLMN for the UE 1102 to initiate access to RLOS). In step 1909, the UE 1102 sends a registration request to AMF 1108 in PLMN-B 1107-B. The registration type in the step 1909 registration request indicates "RLOS registration" and includes parameters similar to that described above in conjunction with the registration request of step 1509. The UE 1102 uses IMEI as the 5GS mobile identity if the UE 1102 has no valid 5G-GUTI or SUCI.

Figure 20:
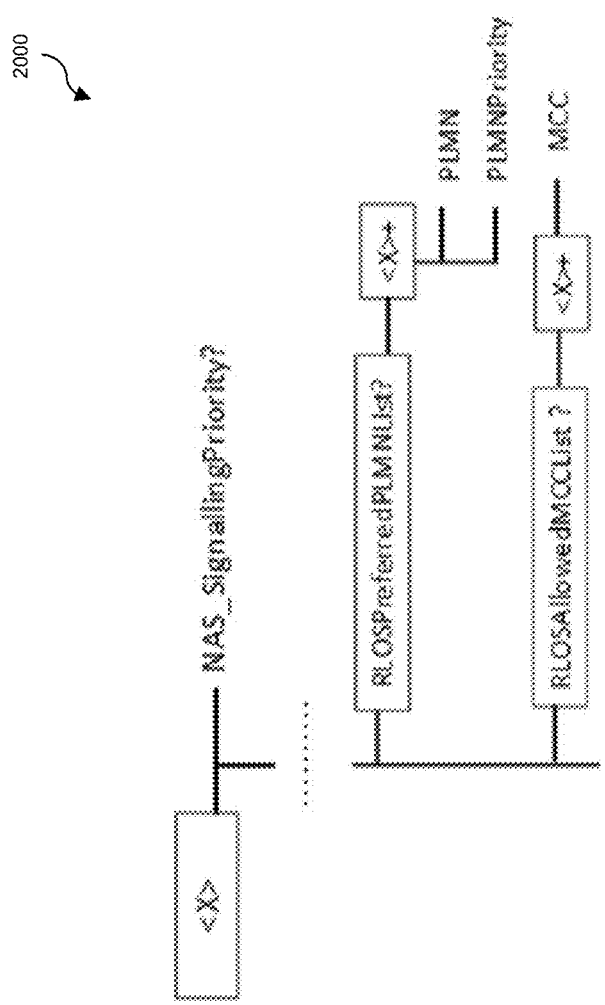
FIG. 20 illustrates a non-access stratum configuration management object, according to an illustrative embodiment.

RLOS related configurations will now be described with respect to FIGS. 20-23. FIG. 20 shows a NAS configuration MO 2000. The RLOSAllowedMCCList interior node contains a list of RLOS allowed MCCs configured to the UE for selection of a PLMN offering access to RLOS. The occurrence is zero or one, the format is node, and the access types are get and replace. The RLOSPreferredPLMNList interior node acts as a placeholder for one or more RLOS preferred PLMNs configured to the UE for selection of a PLMN offering access to RLOS. The occurrence is one or more, the format is node, and the access types are get and replace. The RLOSAllowedMCCList MCC leaf indicates the MCC code of the RLOS allowed MCC. The occurrence is one, the format is chr, the access types are get and replace, and the value is <MCC>, where each digit of the MCC is encoded as an ASCII character. The RLOSPreferredPLMNList PLMN leaf indicates the PLMN code of the RLOS preferred PLMN. The PLMNPriority leaf represents the priority of the RLOS preferred PLMN in the RLOS preferred PLMN list.

FIG. 21 illustrates a UICC/USIM configuration 2100. The $EF_{NASCONFIG}$ (NAS configuration) file is present if the service n°96 is "available.", this file shall be present. This EF contains some of the NAS configuration parameters defined in 3GPP TS 24.368, which is incorporated by reference herein in its entirety. For each of these NAS configuration parameters, a parameter provided in $EF_{NASCONFIG}$ takes precedence over the corresponding parameter stored in the ME's non-volatile memory.

FIG. 22 illustrates NAS configuration parameter information 2200. The RLOSAllowedMCCList has contents containing a list of allowed MCC configured to the UE to allow the UE to check whether the MCC of the network name that advertises RLOS service is present in the list, and whether the MCC part of the IMSI configured in the USIM is present in the list of MCCs before initiating the RLOS connection. FIG. 23 illustrates coding 2300 of the MCC, which may be done according to 3GPP TS 24.008, which is incorporated by reference herein in its entirety. A BCD value of 'D' in any of the MCC digits is used to indicate a "wild" value for that corresponding MCC digit. A value of 'DDD' represents "any" MCC value.

In some embodiments, a method comprises receiving a request for access by UE to RLOS of a communication network and generating a security context for the UE to access the RLOS of the communication network, the security context utilizing one or more security algorithms designated for use in accessing the RLOS of the communication network. An illustrative embodiment may comprise an apparatus comprising at least one processor and at least one memory including computer program code, where the at least one memory and the computer program code are configured to, with the at least one processor, cause the apparatus at least to perform the steps of the above-described method. An illustrative embodiment may comprise an article of manufacture comprising a non-transitory computer-readable storage medium having embodied therein executable program code that when executed by a processor operatively coupled to the computer-readable storage medium cause the processor to perform the steps of the above-described method.

The security context may comprise a native non-current security context. Generating the security context may be responsive to one or more of determining that no valid security context is currently available for the UE, determining that the UE is not provisioned with a UICC or USIM, responsive to failure to authenticate the UE, etc.

Generating the security context for the UE may comprise initiating a secure mode command procedure with the UE. Initiating the secure mode command procedure with the UE may comprise resetting a downlink NAS counter and utilizing the downlink NAS counter to integrity protect an initial secure mode command message. The secure mode command procedure may comprise sending the initial secure mode command message to the UE, the initial secure mode command message specifying a NAS key set identifier IE set to a designated value for accessing RLOS, an encryption algorithm selected from the one or more designated security algorithms, and an integrity algorithm selected from the one or more designated security algorithms.

The request for access may be one of an initial access request, a mobility request, and a service request. The communication network may comprise a 5G network, the apparatus performing the method may comprise an AMF of the 5G network, and the request for access may comprise one of (i) an initial registration request specifying a registration type of RLOS registration and (ii) a registration update request specifying a registration type of RLOS registration. The communication network may comprise a 4G network, the apparatus performing the method may comprise an MME of the 4G network, and the request for access may comprise one of (i) an initial attach request specifying an attach type of RLOS attach and (ii) a TAU request specifying the attach type of RLOS attach.

In some embodiments, a method comprises sending, to a network node of a communication network, a request for access by UE to RLOS of the communication network and generating a security context for the UE to access the RLOS of the communication network, the security context utilizing one or more security algorithms designated for use in accessing the RLOS of the communication network. An illustrative embodiment may comprise an apparatus comprising at least one processor and at least one memory including computer program code, where the at least one memory and the computer program code are configured to, with the at least one processor, cause the apparatus at least to perform the steps of the above-described method. An illustrative embodiment may comprise an article of manufacture comprising a non-transitory computer-readable storage medium having embodied therein executable program code that when executed by a processor operatively coupled to the computer-readable storage medium cause the processor to perform the steps of the above-described method.

The security context may comprise a native non-current security context.

The method may also include receiving, from the network node, an indication of the one or more security algorithms designated for use in accessing the RLOS of the communication network. Receiving the indication of the one or more security algorithms designated for use in accessing the RLOS of the communication network may comprise receiving a secure mode command message specifying a NAS key set identifier information element set to a designated value for accessing RLOS, an encryption algorithm selected from the one or more designated security algorithms, and an integrity algorithm selected from the one or more designated security algorithms.

The request for access may comprise one of an initial access request, a mobility request, and a service request. The communication network may comprise a 5G network, the network node may comprise an AMF of the 5G network, and the request for access may comprise one of (i) an initial registration request specifying a registration type of RLOS registration and (ii) a registration update request specifying a registration type of RLOS registration. The communication network may comprise a 4G network, the network node may comprise an MME of the 4G network, and the request for access may comprise one of (i) an initial attach request specifying an attach type of RLOS attach and (ii) a tracking area update request specifying the attach type of RLOS attach.

In some embodiments, a method comprises maintaining a list of PLMNs that support access for a set of RLOS, checking, at a frequency, whether a set of conditions for triggering access to the set of RLOS is satisfied, receive a request for access by a user application to RLOS of a communication network, and triggering, upon satisfaction of the set of conditions, a PLMN search to find a RLOS qualified communication system for accessing the RLOS. An illustrative embodiment may comprise an apparatus comprising at least one processor and at least one memory including computer program code, where the at least one memory and the computer program code are configured to, with the at least one processor, cause the apparatus at least to perform the steps of the above-described method. The apparatus may also comprise at least one card slot configured for holding a smart card such as a UICC that may contain a USIM application. An illustrative embodiment may comprise an article of manufacture comprising a non-transitory computer-readable storage medium having embodied therein executable program code that when executed by a processor operatively coupled to the computer-readable storage medium cause the processor to perform the steps of the above-described method.

The method may further comprise: sending, upon selecting a RLOS qualified communication system, from UE to a mobility and security management node of the selected communication system, an initial mobility management request to establish connection; receiving, at the UE from the mobility and security management node, a command request indicating a set of security algorithms selected by the communication system to be used for a new security context; sending, from the UE to the mobility and security management node, a confirmation that the selected security algorithms are used to establish the new security context of the UE; and receiving, at the UE from the mobility and security management node, a notification indicating that the mobility management request has been accepted by the communication system.

The method may be performed by an apparatus (e.g., a UE) that has no UICC card inserted in a smart card slot, or which has a UICC card inserted but no USIM application is available on the UICC card.

The communication network may be a 4G EPC network and the selected security algorithms may be {EEA0, EIA0}. The communication network may be a 5GC network and the selected security algorithms may be {NEA0, NIA0}.

The initial mobility management request may be an attach request for accessing a set of RLOS, and the UE may not have a PDN connection to the communication system for accessing the set of RLOS. The initial mobility management request may alternatively be a TAU request and the UE may already have a PDN connection to the communication system for accessing a set of RLOS. The initial mobility management request may alternatively be a service request and the UE may already have a PDN connection to the communication system for accessing a set of RLOS. Upon notification that the mobility management request has been accepted by the communication system, the PDN connection to the communication system for accessing a set of RLOS is established.

The initial mobility management request may be a registration request for accessing a set of RLOS and the UE may not have a PDU session to the communication system for accessing a set of RLOS. Alternatively, the initial mobility management request may be a registration request and the UE may already have a PDU session to the communication system for accessing a set of RLOS. The initial mobility management request may alternatively be a service request and the UE may already have a PDU session to the communication system for accessing a set of RLOS.

The UE may be further configured with at least one of: a list of allowed MCCs representing the country codes of the communication systems where the UE is allowed to request for access of RLOS; and a list of preferred PLMNs representing the preferred communication system for the UE to request for access of RLOS.

A UICC with USIM application may be available on the UE. The UICC with USIM application may be configured with at least one of: a list of allowed MCCs representing the country codes of the communication systems where the UE is allowed to request for access of RLOS; and a list of preferred PLMNs representing the preferred communication system for the UE to request for access of RLOS.

The set of conditions for triggering request for accessing RLOS may be defined as: the UE is in limited service state and UE registration cannot be achieved on any PLMN; the UE supports access to RLOS; the list of RLOS supported PLMNs is not empty; and a list of allowed MCCs is not configured or empty, or a list of allowed MCCs is configured and the UE's MCC part of the IMSI is present in the allowed MCC list.

The set of conditions for triggering request for accessing RLOS when the UICC containing USIM is not available on the UE may be defined as: the UE is in limited service state and UE registration cannot be achieved on any PLMN; the UE supports access to RLOS; and the list of RLOS supported PLMNs is not empty.

In some embodiments, a method comprises maintaining a list of PLMNs that support access for a set of RLOS, checking, at a frequency, whether a set of conditions for triggering access to the set of RLOS is satisfied, receive a request for access by a user application to RLOS of a communication network, and triggering, upon satisfaction of the set of conditions, a PLMN search to find a RLOS qualified communication system for accessing the RLOS.

In some embodiments, a method comprises supporting a set of RLOS that can be accessed by unauthenticated UE, receiving, at a mobility and security management node from UE, an initial mobility management request, sending, at the mobility and security management node, a command request indicating a set of security algorithms selected to be used for a new security context, receiving, at the mobility and security management node from the UE, a confirmation that the selected security algorithms are used to establish the new security context of the UE, and sending, at the mobility and security management node, a notification indicating that the mobility management request has been accepted by the communication system. An illustrative embodiment may comprise an apparatus comprising at least one processor and at least one memory including computer program code, where the at least one memory and the computer program code are configured to, with the at least one processor, cause the apparatus at least to perform the steps of the above-described method. The apparatus may be associated with the mobility and security management node in a communication network. An illustrative embodiment may comprise an article of manufacture comprising a non-transitory computer-readable storage medium having embodied therein executable program code that when executed by a processor operatively coupled to the computer-readable storage medium cause the processor to perform the steps of the above-described method.

The communication network may be a 4G EPC network and the network node may comprise an MME of the 4G network, where the initial mobility management request is an attach request for accessing a set of RLOS, the UE does not have a PDN connection to the communication system for accessing a set of RLOS, the mobility and security management node in the communication network has no security context for the UE, and the selected security algorithms are {EEA0, EIA0}.

The communication network may be a 4G EPC network and the network node may comprise an MME of the 4G network, where the initial mobility management request is a TAU request, the UE already has a PDN connection to the communication system for accessing a set of RLOS, the MME has no security context for the UE, and the selected security algorithms are {EEA0, EIA0}.

The communication network may be a 4G EPC network and the network node may comprise an MME of the 4G network, where the initial mobility management request is a service request, the UE already has a PDN connection to the communication system for accessing a set of RLOS, the MME has no security context for the UE, and the selected security algorithms are {EEA0, EIA0}.

The method may further include, upon receiving an initial mobility management request: sending, from the mobility and security management node in a communication network, an authentication request; receiving, at the mobility and security management node from the UE, an authentication failure message; sending, from the mobility and security management node in a communication network, a command request indicating a set of security algorithms selected by the communication network to be used for a new security context; receiving, at the mobility and security management node from the UE, a confirmation that the selected security algorithms are used to establish the new security context of the UE; and sending, from the mobility and security management node in a communication network, a notification indicating that the mobility management request has been accepted by the communication system.

In some embodiments, no UICC card is inserted into the smart card slot of an apparatus, or a UICC card is inserted but no USIM application is available on the UICC card. The list of allowed MCCs may be configured in at least one of: a processor memory of the apparatus; a memory of the USIM application contained on the UICC card in the slot. If configured in both, the list of allowed MCCs configured in the memory of the USIM application contained on the UICC card takes precedence and is used for checking whether the UE is allowed to request for access of RLOS.

The particular processing operations and other system functionality described in conjunction with diagrams of FIGS. 1-23 are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations, authentication and key agreement protocols, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
at least one processor;
at least one memory including computer program code;
the at least one memory and the computer program code being configured to, with the at least one processor, cause the apparatus at least to:
maintain a list of networks that support access for a set of restricted local operator services;
check whether a set of conditions for triggering access to the set of restricted local operator services is satisfied;
receive a request for access to the set of restricted local operator services;
initiate, upon satisfaction of the set of conditions, a search of the list of networks to find a network for access to the set of restricted local operator services;
send, upon selecting a network, an initial mobility management request to a mobility and security management node of the selected network to establish connection;
receive from the mobility and security management node a command request indicating a set of security algorithms selected by the network to be used for a security context;
send to the mobility and security management node in the selected network a confirmation that the selected set of security algorithms are used to establish the security context; and
receive from the mobility and security management node a notification indicating that the mobility management request has been accepted by the selected network.

2. The apparatus of claim 1, wherein no Universal Integrated Circuit Card (UICC) card is available in the apparatus or a UICC card is available in the apparatus but no Universal Subscriber Identity Module (USIM) application is available on the UICC card.

3. The apparatus of claim 1, wherein the selected network is a fourth generation Evolved Packet Core (EPC) network and the selected set of security algorithms comprises EEA0, EIA0.

4. The apparatus of claim 1, wherein the selected network is a fifth generation core network and the selected set of security algorithms comprises NEA0, NIA0.

5. The apparatus of claim 1, wherein:
the initial mobility management request is an attach request for accessing the set of restricted local operator services; and
the apparatus does not have a packet data network connection to the selected network for accessing the set of restricted local operator services.

6. The apparatus of claim 1, wherein:
the initial mobility management request is a tracking area update request; and
the apparatus already has a packet data network connection to the selected network for accessing the set of restricted local operator services.

7. The apparatus of claim 1, wherein:
the initial mobility management request is a service request; and
the apparatus already has a packet data network connection to the selected network for accessing the set of restricted local operator services.

8. The apparatus of claim 1, wherein upon notification that the mobility management request has been accepted by the selected network, the packet data network connection to the selected network for accessing the set of restricted local operator services is established.

9. The apparatus of claim 1, wherein:
the initial mobility management request is a registration request for accessing the set of local operator services; and
the apparatus does not have a Protocol Data Unit (PDU) session to the selected network for accessing the set of restricted local operator services.

10. The apparatus of claim 1, wherein:
the initial mobility management request is a registration request; and
the apparatus already has a Protocol Data Unit (PDU) session to the selected network for accessing the set of restricted local operator services.

11. The apparatus of claim 1, wherein:
the initial mobility management request is a service request; and
the apparatus already has a Protocol Data Unit (PDU) session to the selected network for accessing the set of restricted local operator services.

12. The apparatus of claim 1, wherein the apparatus is further configured with at least one of:
a list of allowed Mobile Country Codes (MCCs) representing country codes of the networks where the apparatus is allowed to request for access of the set of restricted local operator services; and
a list of networks representing preferred networks for the apparatus to request for access of the set of restricted local operator services.

13. The apparatus of claim 1, wherein that apparatus comprises a Universal Integrated Circuit Card (UICC) card with a Universal Subscriber Identity Module (USIM) application.

14. The apparatus of claim 13, wherein the UICC card with the USIM application is further configured with:
a list of allowed Mobile Country Codes (MCCs) representing country codes of the networks where the apparatus is allowed to request for access of the set of restricted local operator services; and
a list of networks representing preferred networks for the apparatus to request for access of the set of restricted local operator services.

15. The apparatus of claim 13, wherein the set of conditions for triggering the request for accessing the set of restricted local operator services comprises one or more of:
a first condition wherein the apparatus is in a limited service state and a registration cannot be achieved on any network;
a second condition wherein the apparatus supports access to the set of restricted local operator services;
a third condition wherein the list of networks that support the set of restricted local operator services is not empty; and
a fourth condition wherein a list of allowed Mobile Country Codes (MCCs) is not configured or empty, or a list of allowed MCCs is configured and the MCC part of the International Mobile Subscriber Identity (IMSI) of the apparatus is present in the allowed MCC list.

16. The apparatus of claim 2, wherein the set of conditions for triggering the request for accessing the set of restricted local operator services when the UICC containing the USIM application is not available on the apparatus comprises one or more of:
a first condition wherein the apparatus is in a limited service state and a registration cannot be achieved on any network;
a second condition wherein the apparatus supports access to the set of restricted local operator services; and
a third condition wherein the list of networks that support the set of restricted local operator services is not empty.

17. A method comprising:
maintaining a list of networks that support access for a set of restricted local operator services;
checking whether a set of conditions for triggering access to the set of restricted local operator services is satisfied;
receiving a request for access to the set of restricted local operator service;
initiating, upon satisfaction of the set of conditions, a search of the list of networks to find a qualified network for access to the set of restricted local operator services;
sending, upon selecting a network, an initial mobility management request to a mobility and security management node of the selected network to establish connection;
receiving from the mobility and security management node a command request indicating a set of security algorithms selected by the network to be used for a security context;
sending to the mobility and security management node in the selected network a confirmation that the selected set of security algorithms are used to establish the security context; and
receiving from the mobility and security management node a notification indicating that the mobility management request has been accepted by the selected network;
wherein the steps are performed by at least one processor.

18. An article of manufacture comprising a non-transitory computer-readable storage medium having embodied therein executable program code that when executed by the processor operatively coupled to the computer-readable storage medium cause the processor to:
maintain a list of networks that support access for a set of restricted local operator services;
check whether a set of conditions for triggering access to the set of restricted local operator services is satisfied;
receive a request for access to the set of restricted local operator service;
initiate, upon satisfaction of the set of conditions, a search of the list of networks to find a qualified network for access to the set of restricted local operator services;
send, upon selecting a network, an initial mobility management request to a mobility and security management node of the selected network to establish connection;
receive from the mobility and security management node a command request indicating a set of security algorithms selected by the network to be used for a security context;
send to the mobility and security management node in the selected network a confirmation that the selected set of security algorithms are used to establish the security context; and
receive from the mobility and security management node a notification indicating that the mobility management request has been accepted by the selected network.

19. An apparatus comprising:
at least one processor;
at least one memory including computer program code;
the at least one memory and the computer program code being configured to, with the at least one processor, cause the apparatus at least to:
support a set of restricted local operator services that can be accessed by unauthenticated user equipment;
receive an initial mobility management request from the unauthenticated user equipment;
send a command request to the unauthenticated user equipment indicating a set of security algorithms to be used for a security context;
receive from the unauthenticated user equipment a confirmation that the set of security algorithms are used to establish the security context; and
send a notification to the unauthenticated user equipment indicating that the mobility management request has been accepted.

20. The apparatus of claim 19, wherein the apparatus is part of a mobility management entity of a fourth generation Evolved Packet Core (EPC) network and further wherein one or more of:
the initial mobility management request is an attach request for accessing the set of restricted local operator services;
the unauthenticated user equipment does not have a packet data network connection to the network for accessing the set of restricted local operator services;
the mobility management entity has no security context for the unauthenticated user equipment; and
the set of security algorithms comprises EEA0 and EIA0.

21. The apparatus of claim 19, wherein the apparatus is part of a mobility management entity of a fourth generation Evolved Packet Core (EPC) network and further wherein one or more of:
the initial mobility management request is a tracking area update request;
the unauthenticated user equipment already has a packet data network connection to the network for accessing the set of restricted local operator services;
the apparatus has no security context for the unauthenticated user equipment; and
the set of security algorithms comprises $EEA_0$ and EIA0.

22. The apparatus of claim 19, wherein the apparatus is part of a mobility management entity of a fourth generation Evolved Packet Core (EPC) network and further wherein one or more of:
the initial mobility management request is a service request;
the unauthenticated user equipment already has a packet data network connection to the network for accessing the set of restricted local operator services;
the apparatus has no security context for the unauthenticated user equipment; and
the set of security algorithms comprises EEA0 and EIA0.

23. The apparatus of claim 19, wherein the apparatus, upon receiving an initial mobility management request, is further configured to:
send an authentication request;
receive an authentication failure message from the unauthenticated user equipment;
send a command request to the unauthenticated user equipment indicating the set of security algorithms selected by the network to be used for the security context;
receive from the unauthenticated user equipment a confirmation that the set of security algorithms are used to establish the security context; and
send a notification to the unauthenticated user equipment indicating that the mobility management request has been accepted.

24. The apparatus of claim 19, wherein the selected network is a fifth generation core network and the selected set of security algorithms comprises NEA0 and NIA0.

25. A method comprising:
supporting a set of restricted local operator services that can be accessed by an unauthenticated user equipment;
receiving an initial mobility management request from the unauthenticated user equipment;
sending a command request to the unauthenticated user equipment indicating a set of security algorithms to be used for a security context;
receiving from the unauthenticated user equipment a confirmation that the set of security algorithms are used to establish the security context; and
sending a notification to the unauthenticated user equipment indicating that the mobility management request has been accepted;
wherein the steps are performed by at least one processor.

26. An article of manufacture comprising a non-transitory computer-readable storage medium having embodied therein executable program code that when executed by the processor operatively coupled to the computer-readable storage medium cause the processor to:
support a set of restricted local operator services that can be accessed by an unauthenticated user equipment;
receive an initial mobility management request from the unauthenticated user equipment;
send a command request to the unauthenticated user equipment indicating a set of security algorithms to be used for a security context;
receive from the unauthenticated user equipment a confirmation that the set of security algorithms are used to establish the security context; and
send a notification to the unauthenticated user equipment indicating that the mobility management request has been accepted.

27. The method of claim 17, wherein the selected network the selected network is a fourth generation Evolved Packet Core (EPC) network and the selected set of security algorithms comprises EEA0, EIA0.

* * * * *